(12) United States Patent
Babaei

(10) Patent No.: US 11,778,687 B2
(45) Date of Patent: *Oct. 3, 2023

(54) SIGNALING FOR CANCELLATION OF TRANSMISSION ON AN UPLINK CARRIER

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/340,491

(22) Filed: Jun. 7, 2021

(65) Prior Publication Data

US 2021/0298118 A1   Sep. 23, 2021

Related U.S. Application Data

(63) Continuation of application No. 17/200,970, filed on Mar. 15, 2021, now Pat. No. 11,064,560, which is a
(Continued)

(51) Int. Cl.
*H04L 12/28* (2006.01)
*H04W 76/36* (2018.01)
(Continued)

(52) U.S. Cl.
CPC .......... *H04W 76/36* (2018.02); *H04W 24/08* (2013.01); *H04W 72/0453* (2013.01);
(Continued)

(58) Field of Classification Search
CPC . H04W 72/1268; H04W 76/36; H04W 48/16; H04W 72/0446
(Continued)

(56) References Cited

U.S. PATENT DOCUMENTS

2015/0296540 A1   10/2015   Yum et al.
2020/0053778 A1   2/2020    Babaei et al.
(Continued)

OTHER PUBLICATIONS

3GPP TS 38.211 V15.7.0 (Sep. 2019); Technical Specification; 3rd Generation Partnership Project; Technical Specification Group Radio Access Network; NR; Physical channels and modulation; (Release 15).
(Continued)

*Primary Examiner* — John Pezzlo
(74) *Attorney, Agent, or Firm* — Alireza Babaei

(57) ABSTRACT

A wireless device receives configuration parameters indicating a first position and a second position. The first position may be in a first number of bit. The second position may be in a second number of bit. The first number of bit and the second number of bit may be based on a payload size. The wireless device may receive cancellation indications. The wireless device may cancel a scheduled transmission based on a first cancellation indication of the cancellation indications. The first cancellation indication may be based on the first position when the scheduled transmission is for a normal carrier and may be based on the second position when the scheduled transmission is for a supplementary carrier.

20 Claims, 30 Drawing Sheets

US 11,778,687 B2

Page 2

Related U.S. Application Data continuation of application No. 17/092,244, filed on Nov. 7, 2020, now Pat. No. 10,986,695.

(60) Provisional application No. 62/932,487, filed on Nov. 7, 2019.

(51) Int. Cl.
```
H04W 72/0453    (2023.01)
H04W 76/11      (2018.01)
H04W 24/08      (2009.01)
H04W 72/1268    (2023.01)
H04W 72/23      (2023.01)
H04J 1/16       (2006.01)
```

(52) U.S. Cl.
CPC ....... *H04W 72/1268* (2013.01); *H04W 72/23* (2023.01); *H04W 76/11* (2018.02)

(58) Field of Classification Search
USPC .............................. 370/252, 329, 430, 442
See application file for complete search history.

(56) References Cited

U.S. PATENT DOCUMENTS

| | | | |
|---|---|---|---|
| 2020/0344747 A1* | 10/2020 | Park | H04W 72/21 |
| 2020/0351897 A1 | 11/2020 | Fakoorian et al. | |
| 2020/0358555 A1* | 11/2020 | Chen | H04L 1/0042 |
| 2020/0359447 A1 | 11/2020 | Yang et al. | |
| 2020/0367278 A1 | 11/2020 | Hosseini et al. | |
| 2020/0389876 A1 | 12/2020 | Islam et al. | |
| 2021/0076409 A1 | 3/2021 | Goto et al. | |
| 2021/0100031 A1* | 4/2021 | Cirik | H04W 76/19 |
| 2021/0320833 A1* | 10/2021 | Kim | H04J 11/0076 |
| 2022/0248376 A1* | 8/2022 | Hui | H04L 5/001 |

OTHER PUBLICATIONS

3GPP TS 38.212 V15.7.0 (Sep. 2019); Technical Specification; 3rd Generation Partnership Project; Technical Specification Group Radio Access Network; NR; Multiplexing and channel coding; (Release 15).
3GPP TS 38.213 V15.7.0 (Sep. 2019); Technical Specification; 3rd Generation Partnership Project; Technical Specification Group Radio Access Network; NR; Physical layer procedures for control; (Release 15).
3GPP TS 38.214 V15.7.0 (Sep. 2019); Technical Specification; 3rd Generation Partnership Project; Technical Specification Group Radio Access Network; NR; Physical layer procedures for data; (Release 15).
3GPP TS 38.300 V15.7.0 (Sep. 2019); Technical Specification; 3rd Generation Partnership Project; Technical Specification Group Radio Access Network; NR; NR and NG-RAN Overall Description; Stage 2; (Release 15).
3GPP TS 38.321 V15.7.0 (Sep. 2019); Technical Specification; 3rd Generation Partnership Project; Technical Specification Group Radio Access Network; NR; Medium Access Control (MAC) protocol specification; (Release 15).
3GPP TS 38.331 V15.7.0 (Sep. 2019); Technical Specification; 3rd Generation Partnership Project; Technical Specification Group Radio Access Network; NR; Radio Resource Control (RRC); Protocol specification; (Release 15 ).
R1-1911429; 3GPP TSG RAN WG1 Meeting #98bis; Chongqing, China, Oct. 14-18, 2019; Source: MCC Support; Title: Final Report of 3GPP TSG RAN WG1 #98 v2.0.0; (Prague, Czech Rep, Aug. 26-30, 2019); Document for: Approval.
R1-1907973; 3GPP TSG RAN WG1 Meeting #98; Prague, Czech Rep, Aug. 26-30, 2019; Source: MCC Support; Title: Final Report of 3GPP TSG RAN WG1 #97 v1.0.0; (Reno, USA, May 13-17, 2019); Document for: Approval.
R1-1908055; 3GPP TSG RAN WG1 Meeting #98; Prague, Czech Republic, Aug. 26-30, 2019; Agenda Item: 7.2.6.5; Source: Huawei, HiSilicon; Title: UL inter-UE transmission prioritization and multiplexing; Document for: Discussion and Decision.
R1-1908125; 3GPP TSG RAN WG1 Meeting #98; Prague, Czech Republic, Aug. 26-30, 2019; Agenda Item: 7.2.6.5; Source: Ericsson; Title: Inter-UE Prioritization and Multiplexing of UL Transmissions; Document for: Discussion, Decision.
R1-1908162; 3GPP TSG RAN WG1 #98; Prague, CZ, Aug. 26-30, 2019; Source: vivo; Title: UL inter-UE Tx prioritization for URLLC; Agenda Item: 7.2.6.5; Document for: Discussion and Decision.
R1-1908281; 3GPP TSG RAN WG1 #98; Prague, Czech Republic, Aug. 26-30, 2019; Agenda Item: 7.2.6.5; Source: NEC; Title: Enhanced inter-UE Tx prioritisation and multiplexing; Document for: Discussion/Decision.
R1-1908412; 3GPP TSG RAN1 WG1 Meeting #98; Prague, Czech, Aug. 26-30, 2019; Agenda item: 7.2.6.5; Title: On uplink inter-UE transmission prioritization and multiplexing; Source: MediaTek Inc.; Document for: Discussion and Decision.
R1-1908545; 3GPP TSG RAN WG1 #98; Prague, CZ, Aug. 26-30, 2019; Agenda Item: 7.2.6.5; Source: LG Electronics; Title: Discussion on UL inter UE Tx prioritization; Document for: Discussion and decision.
R1-1908649; 3GPP TSG RAN WG1 Meeting #98; Prague, CZ, Aug. 26-30, 2019; Source: Intel Corporation; Title: Enhanced inter-UE Tx prioritization/multiplexing; Agenda item: 7.2.6.5; Document for: Discussion and Decision.
R1-1908671; 3GPP TSG RAN WG1 #98; Prague, Czech, Aug. 26-30, 2019; Source: OPPO; Title: Inter UE Tx prioritization and multiplexing; Agenda Item: 7.2.6.5; Document for: Discussion and Decision.
R1-1908868; 3GPP TSG RAN WG1 #98; Prague, CZ, Aug. 26-30, 2019; Agenda item: 7.2.6.5; Source: CMCC; Title: Discussion on UL inter UE Tx prioritization/multiplexing; Document for: Discussion and Decision.
R1-1908969; 3GPP TSG RAN WG1 #98; Prague, USCZA, Aug. 26-30, 2019; Source: Panasonic; Title: On Inter UE Tx prioritization/multiplexing enhancements for NR URLLC; Agenda Item: 7.2.6.5; Document for: Discussion.
R1-1909149; 3GPP TSG RAN WG1 #98; Prague, CZ, Aug. 26-30, 2019; Agenda Item: 7.2.6.5; Source: Motorola Mobility, Lenovo; Title: Enhanced inter UE Tx prioritization/multiplexing for URLLC; Document for: Discussion.
R1-1909197; 3GPP TSG RAN WG1 #98; Prague, CZ, Aug. 26-30, 2019; Source: NTT DOCOMO, Inc.; Title: UL inter-UE transmission prioritization/multiplexing; Agenda Item: 7.2.6.5; Document for: Discussion and Decision.
R1-1909268; 3GPP TSG-RAN WG1 #98; Aug. 26-30, 2019; Prague, Czech Republic; Agenda item: 7.2.6.5; Source: Qualcomm Incorporated; Title: Uplink inter-UE Tx Multiplexing and Prioritization; Document for: Discussion/Decision.
R1-1909453; 3GPP TSG RAN WG1 #98; Prague, Czech, Aug. 26-30, 2019; Agenda Item: 7.2.6.5; Source: InterDigital Inc.; Title: Enhanced Inter UE Transmit prioritization/multiplexing for eURLLC; Document for: Discussion and Decision.
R1-1910070; 3GPP TSG RAN WG1 Meeting #98bis; Chongqing, China, Oct. 14-20, 2019; Agenda Item: 7.2.6.5; Source: Huawei, HiSilicon; Title: UL inter-UE transmission prioritization and multiplexing; Document for: Discussion and Decision.
R1-1910104; 3GPP TSG RAN WG1 #98bis; Chongqing, China, Oct. 14-20, 2019; Source: ZTE; Title: UL Inter-UE multiplexing between eMBB and URLLC; Agenda item: 7.2.6.5; Document for: Discussion and Decision.
R1-1910168; 3GPP TSG RAN WG1 #98 bis; Chongqing, China, Oct. 14-20, 2019; Agenda item: 7.2.6.5; Source: CMCC; Title: Discussion on UL inter UE Tx prioritization/multiplexing; Document for: Discussion and Decision.
R1-1910225; 3GPP TSG RAN WG1 #98bis; Chongqing, China, Oct. 14-20, 2019; Source: vivo; Title: UL Inter-UE Tx prioritization for URLLC; Agenda Item: 7.2.6.5; Document for: Discussion and Decision.

(56) References Cited

OTHER PUBLICATIONS

R1-1910345; 3GPP TSG RAN WG1 Meeting #98bis; Chongqing, China, Oct. 14-20, 2019; Source: CATT; Title: Discussion on inter-UE UL multiplexing; Agenda Item: 7.2.6.5; Document for: Discussion and Decision.

R1-1910487; 3GPP TSG RAN WG1 #98bis; Chongqing, China, Oct. 14-20, 2019; Agenda item: 7.2.6.5; Source: Samsung; Title: UL inter-UE multiplexing/prioritization; Document for: Discussion and Decision.

R1-1910522; 3GPP TSG RAN WG1 #98bis; Chongqing, China, Oct. 14-20, 2019; Source: Panasonic; Title: On inter UE Tx prioritization/multiplexing enhancements for NR URLLC; Agenda Item: 7.2.6.5; Document for: Discussion.

R1-1910530; 3GPP TSG RAN WG1 #98bis; Chongqing, China, Oct. 14-18, 2019; Agenda Item: 7.2.6.5; Source: NEC; Title: Enhanced inter-UE Tx prioritisation and multiplexing; Document for: Discussion/Decision.

R1-1910549; 3GPP TSG-RAN WG1 Meeting #98bis; Chongqing, China, Oct. 14-20, 2019; Agenda Item: 7.2.6.5; Source: Ericsson; Title: Inter-UE Prioritization and Multiplexing of UL Transmissions; Document for: Discussion, Decision.

R1-1910623; 3GPP TSG RAN WG1 #98bis; Chongqing, China, Oct. 14-20, 2019; Source: OPPO; Title: Inter UE Tx prioritization and multiplexing; Agenda Item: 7.2.6.5; Document for: Discussion and Decision.

R1-1910664; 3GPP TSG RAN WG1 #98bis; Chongqing, China, Oct. 14-20, 2019; Source: Intel Corporation; Title: Enhancements to inter-UE multiplexing; Agenda item: 7.2.6.5; Document for: Discussion and Decision.

R1-1910772; 3GPP TSG RAN WG1 #98bis; Chongqing, China, Oct. 14-20, 2019; Agenda Item: 7.2.6.5; Source: Sony; Title: UL Inter UE transmission prioritisation & multiplexing; Document for: Discussion / decision.

R1-1910830; 3GPP TSG RAN WG1 #98bis; Chongqing, China, Oct. 14-20, 2019; Agenda Item: 7.2.6.5; Source: LG Electronics; Title: Discussion on UL inter UE Tx prioritization; Document for: Discussion and decision.

R1-1910868; 3GPP TSG RAN WG1 Meeting #98-Bis; Chongqing, China, Oct. 14-20, 2019; Agenda item: 7.2.6.5; Source: Nokia, Nokia Shanghai Bell; Title: UL inter-UE eMBB and URLLC multiplexing enhancements; Document for: Discussion and Decision.

R1-1910937; 3GPP TSG RAN WG1 Meeting #98b; Chongqing, China, Oct. 14-Oct. 20, 2019; Source: Sharp; Title: UL cancelation indication design for enhanced inter UE Tx prioritization/multiplexing; Agenda Item: 7.2.6.5; Document for: Discussion and Decision.

R1-1911000; 3GPP TSG RAN WG1 #98bis; Chongqing, China, Oct. 14-20, 2019; Source: ETRI; Title: Enhanced inter UE Tx prioritization/multiplexing; Agenda Item: 7.2.6.5 Enhanced inter UE Tx prioritization/multiplexing; Document for: Discussion.

R1-1911082; 3GPP TSG RAN1 WG1 Meeting #98bis; Chongqing, China, Oct. 14-20, 2019; Agenda item: 7.2.6.5; Title: On uplink inter-UE transmission prioritization and multiplexing; Source: MediaTek Inc.; Document for: Discussion and Decision.

R1-1911122; 3GPP TSG-RAN WG1 #98b; Oct. 14-20, 2019; Chongqing, China; Agenda item: 7.2.6.5; Source: Qualcomm Incorporated; Title: Uplink Inter-UE Tx Multiplexing and Prioritization; Document for: Discussion/Decision.

R1-1911179; 3GPP TSG RAN WG1 #98bis; Chongqing, China, Oct. 14-20, 2019; Source: NTT DOCOMO, INC.; Title: UL inter-UE transmission prioritization/multiplexing; Agenda Item: 7.2.6.5; Document for: Discussion and Decision.

R1-1911252; 3GPP TSG RAN WG1 #98bis; Chongqing, China, Oct. 14-20, 2019; Agenda Item: 7.2.6.5; Source: KT Corp.; Title: Considerations on Enhanced inter UE Tx prioritization/multiplexing; Document for: Discussion and Decision.

R1-1911300; 3GPP TSG RAN WG1 #98bis; Chongqing, China, Oct. 14-20, 2019; Agenda Item: 7.2.6.5; Source: Motorola Mobility, Lenovo; Title: Enhanced inter UE Tx prioritization/multiplexing for URLLC; Document for: Discussion.

R1-1911307; 3GPP TSG RAN WG1 #98bis; Chongqing, China, Oct. 14-20, 2019; Agenda Item: 7.2.6.5; Source: Sequans; Title: Considerations on UL inter-UE multiplexing for URLLC; Document for: Discussion and decision.

R1-1911318; 3GPP TSG RAN WG1 #98bis; Chongqing, China, Oct. 14-20, 2019; Source: WILUS Inc.; Title: On UL cancellation scheme for NR URLLC; Agenda item: 7.2.6.5; Document for: Discussion/Decision.

R1-1911327; 3GPP TSG RAN WG1 Meeting #98bis; Chongqing, China, Oct. 14-20, 2019; Source: CAICT Title: Enhanced inter UE Tx prioritization/multiplexing for URLLC; Agenda Item: 7.2.6.5; Document for: Discussion / Decision.

R1-1911337; 3GPP TSG RAN WG1 #98bis; Chongqing, China, Oct. 14-20, 2019; Agenda Item: 7.2.6.5; Source: InterDigital Inc.; Title: Enhanced Inter UE Transmit prioritization/multiplexing for eURLLC; Document for: Discussion and Decision.

\* cited by examiner

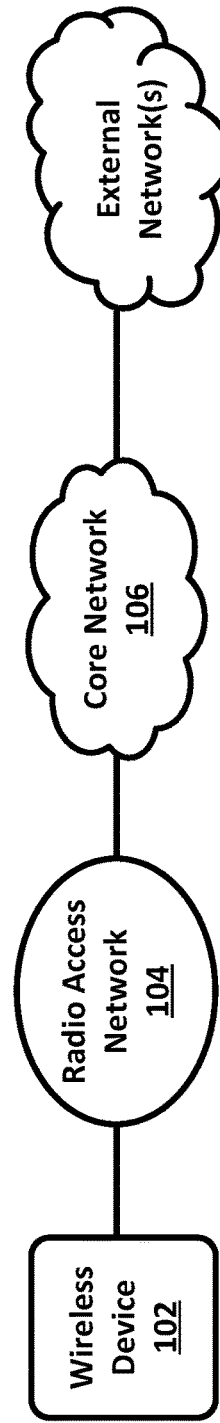
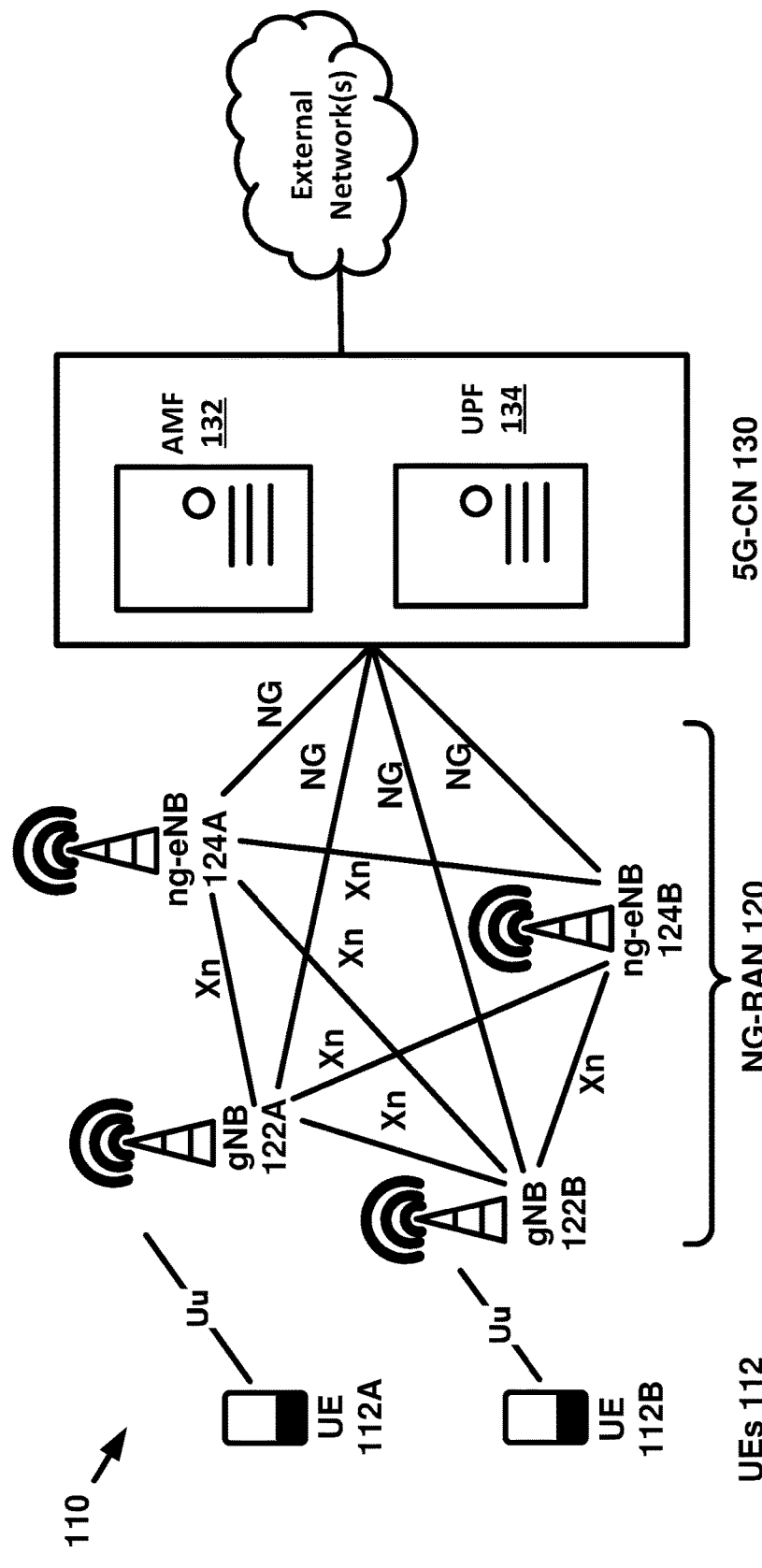

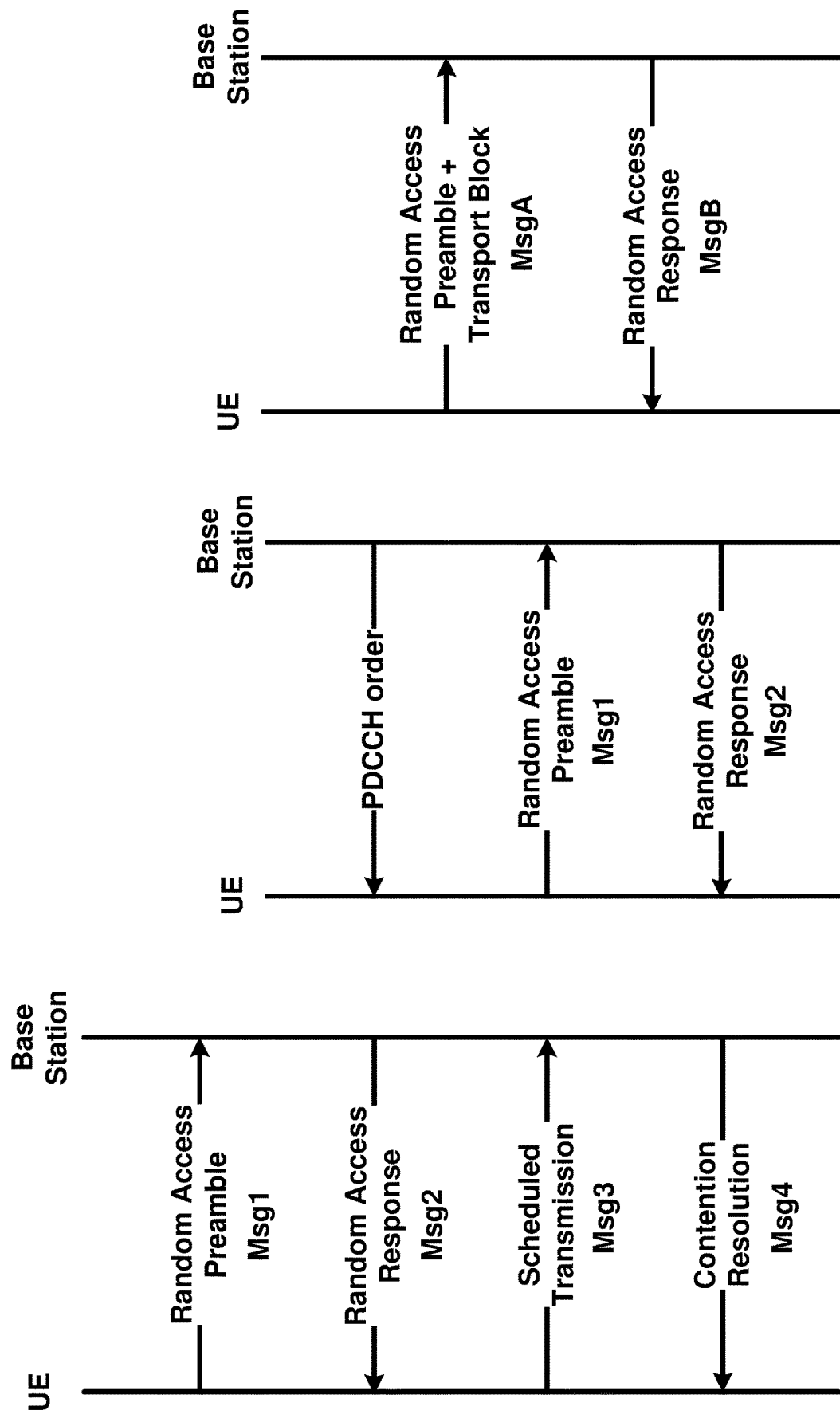

```
UplinkCancellationIndication ::=            SEQUENCE {
    ci-RNTI                                 CI-Value,
    timeFrequencySet                        ENUMERATED {set0, set1},
    dci-PayloadSize                         INTEGER (0..maxINT-DCI-PayloadSize),
    ci-ConfigurationPerServingCell          SEQUENCE (SIZE (1..maxNrofServingCells)) OF CI-ConfigurationPerServingCell,
    ...
}

CI-ConfigurationPerServingCell ::= SEQUENCE {
    servingCellId                           ServCellIndex,
    positionInDCI                           INTEGER (0..maxINT-DCI-PayloadSize-1),
    positionInDCI-SUL                       INTEGER (0..maxINT-DCI-PayloadSize-1)
}
```

FIG. 19

```
UplinkCancellationIndication ::=        SEQUENCE {
    ci-RNTI
    timeFrequencySet                    CI-Value,
    dci-PayloadSize                     ENUMERATED {set0, set1},
    ci-ConfigurationPerServingCell      INTEGER (0..maxINT-DCI-PayloadSize),
                                        SEQUENCE (SIZE (1..maxNrofServingCells)) OF
CI-ConfigurationPerServingCell,
    ...
}

CI-ConfigurationPerServingCell ::= SEQUENCE {
    servingCellId                       ServCellIndex,
    bwpId                               bwp-Id
    positionInDCI                       INTEGER (0..maxINT-DCI-PayloadSize-1)
}
```

FIG. 21

```
CIConfig ::=            SEQUENCE {
    ci-Index                INTEGER (1..15)
    ci-IndexSUL             INTEGER (1..15)
    targetCell              ServCellIndex
    ...
}
```

FIG. 23

```
CIConfig ::=    SEQUENCE {
    ci-Index              INTEGER (1..15)
    targetCell            ServCellIndex
    targetBWP             BWPIndex
    ...
}
```

FIG. 25

Receive UL CI configuration parameters comprising:
a cancellation indication RNTI; and
a sequence of serving cell-specific parameters comprising: an identifier of a serving cell; a 1st parameter indicating a 1st position in a DCI for the serving cell; and a 2nd parameter indicating a 2nd position in a DCI for a SUL carrier of the serving cell

2810

Receive a 1st DCI, associated with the cancellation indication RNTI, comprising cancellation indications

2820

Determine a 1st cancellation indication, in the cancellation indications, based on:
the 1st position when a scheduled uplink transmission is for a normal uplink carrier of the serving cell; and
the 2nd position when the scheduled uplink transmission is for the SUL carrier of the serving cell

2830

Cancel the scheduled UL transmission based on the 1st cancellation indication

SIGNALING FOR CANCELLATION OF TRANSMISSION ON AN UPLINK CARRIER

CROSS-REFERENCE TO RELATED APPLICATIONS

This application is a continuation of U.S. application Ser. No. 17/200,970, filed Mar. 15, 2021, which is a continuation of U.S. application Ser. No. 17/092,244, filed Nov. 7, 2020, now U.S. Pat. No. 10,986,695, which claims the benefit of U.S. Provisional Application No. 62/932,487, filed Nov. 7, 2019, which is hereby incorporated by reference in its entirety.

BRIEF DESCRIPTION OF THE DRAWINGS

FIG. 1A and FIG. 1B show examples of mobile communications systems in accordance with several of various embodiments of the present disclosure.

FIG. 12A, FIG. 12B and FIG. 12C show example random access processes in accordance with several of various embodiments of the present disclosure.

FIG. 19 shows an example information element for uplink cancellation indication in accordance with several of various embodiments of the present disclosure.

FIG. 21 shows an example information element for uplink cancellation indication in accordance with several of various embodiments of the present disclosure.

FIG. 23 shows an example information element for uplink cancellation indication in accordance with several of various embodiments of the present disclosure.

FIG. 25 shows an example information element for uplink cancellation indication in accordance with several of various embodiments of the present disclosure.

FIG. 28 shows an example flow diagram in accordance with several of various embodiments of the present disclosure.

DETAILED DESCRIPTION

Figure 2A:
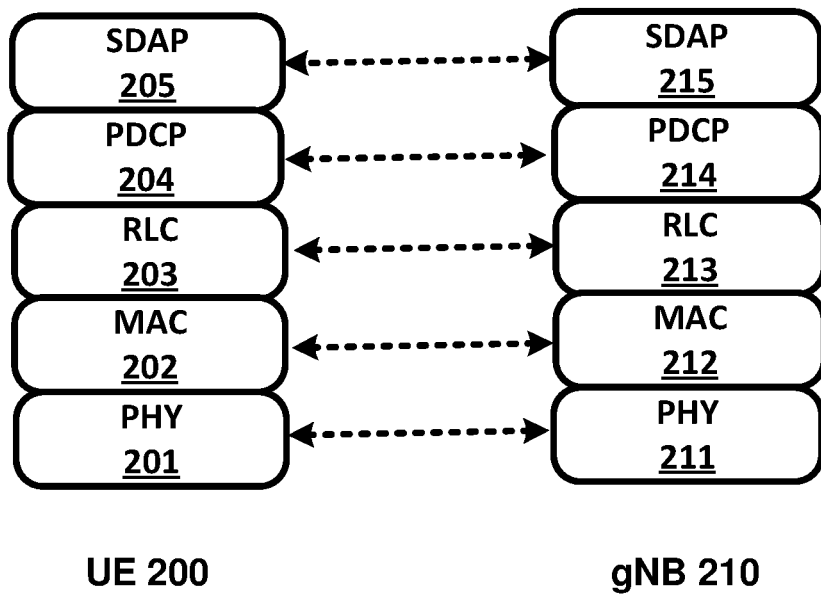
FIG. 2A and FIG. 2B show examples of user plane and control plane protocol layers in accordance with several of various embodiments of the present disclosure.

The exemplary embodiments of the disclosed technology enable uplink cancellation indication operation in a wireless device and/or one or more base stations. The exemplary disclosed embodiments may be implemented in the technical field of wireless communication systems. More particularly, the embodiment of the disclosed technology may relate to signaling and determination of uplink cancellation indication.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
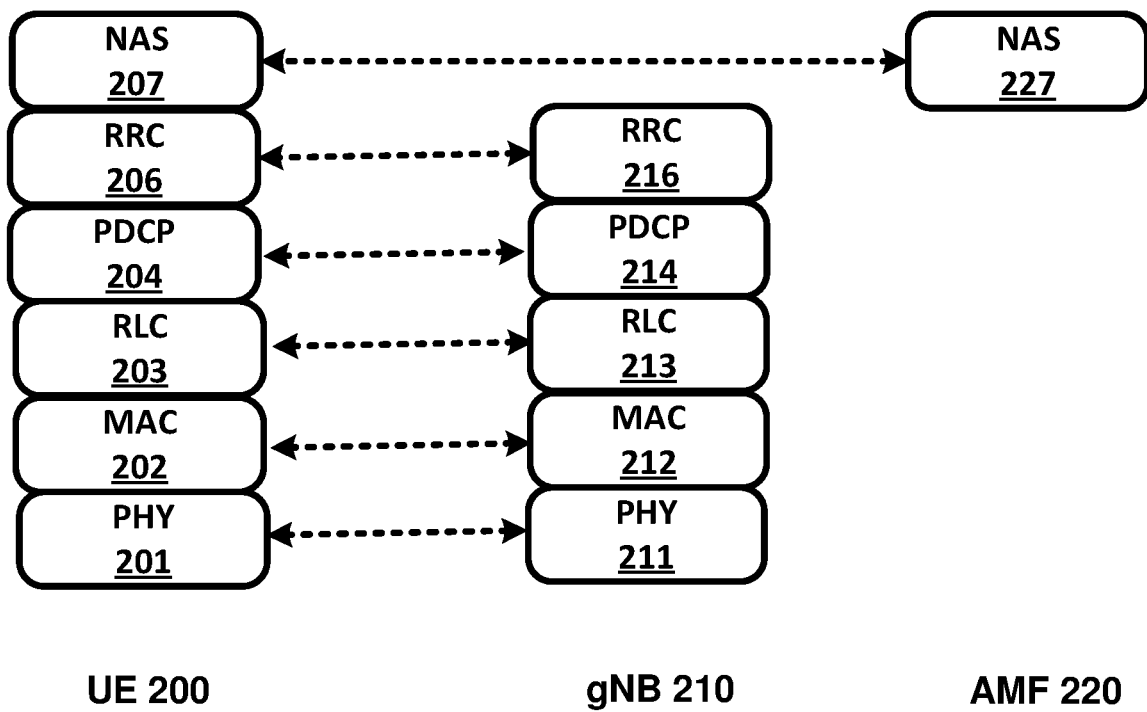

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
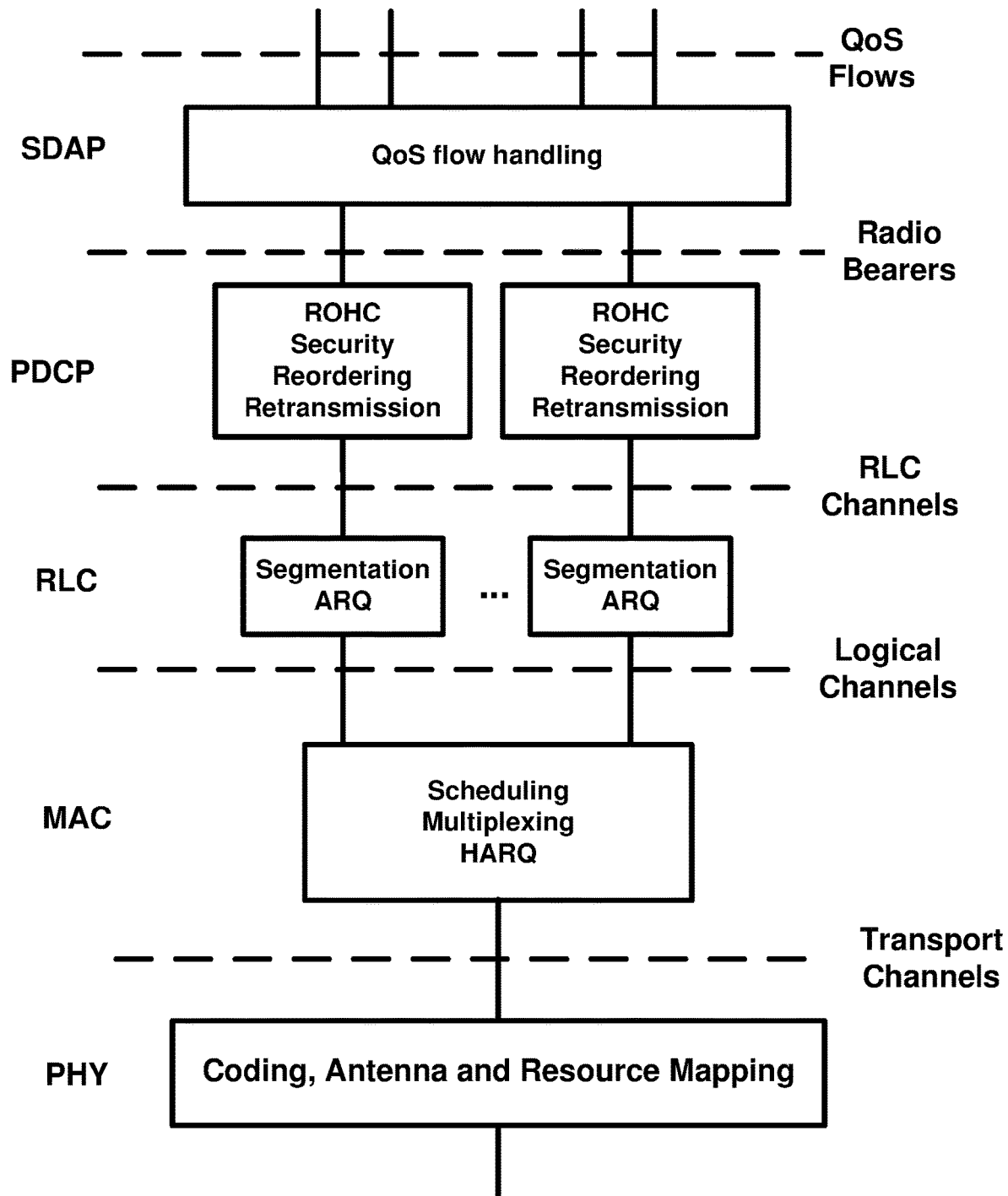
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
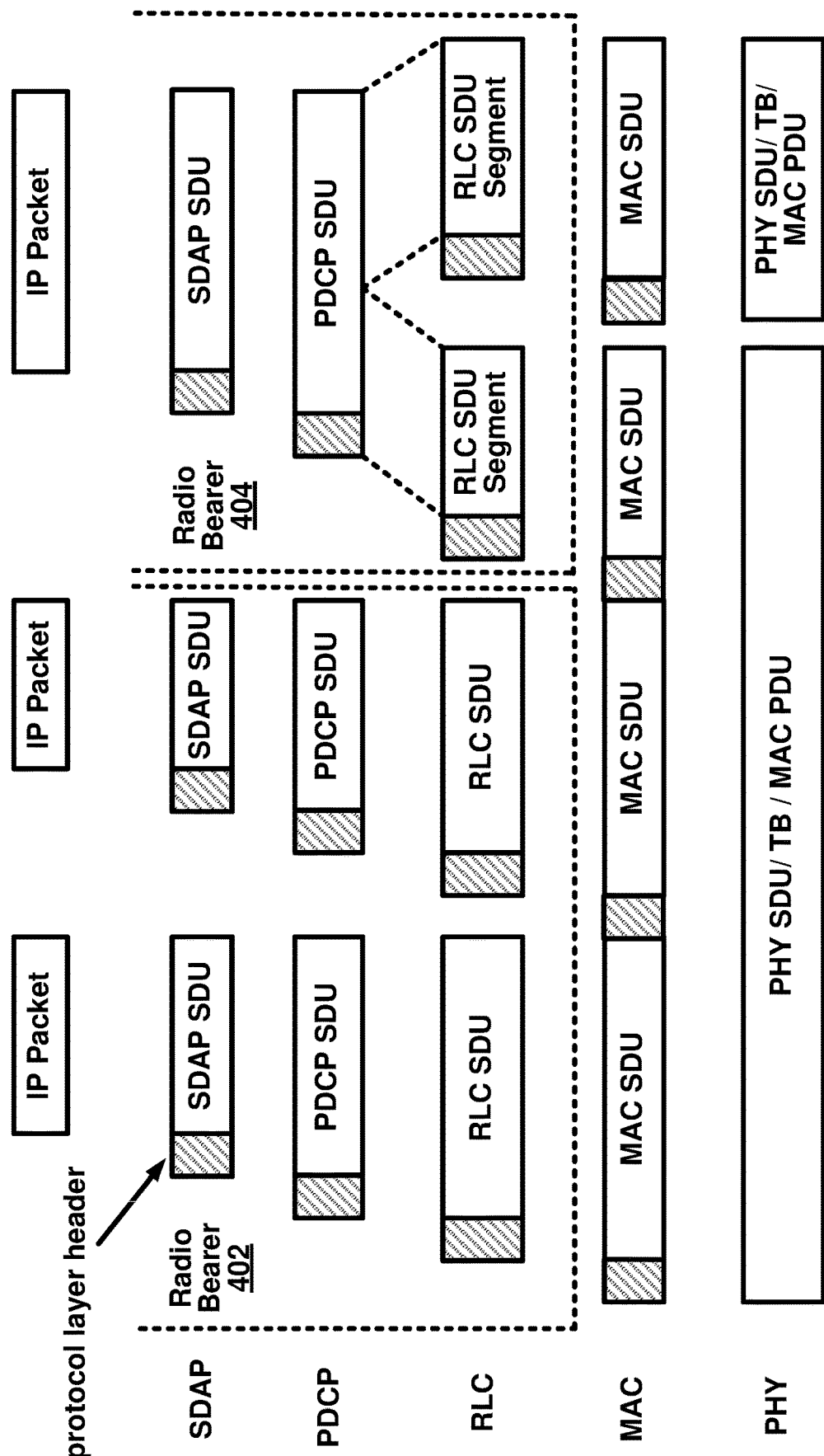
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
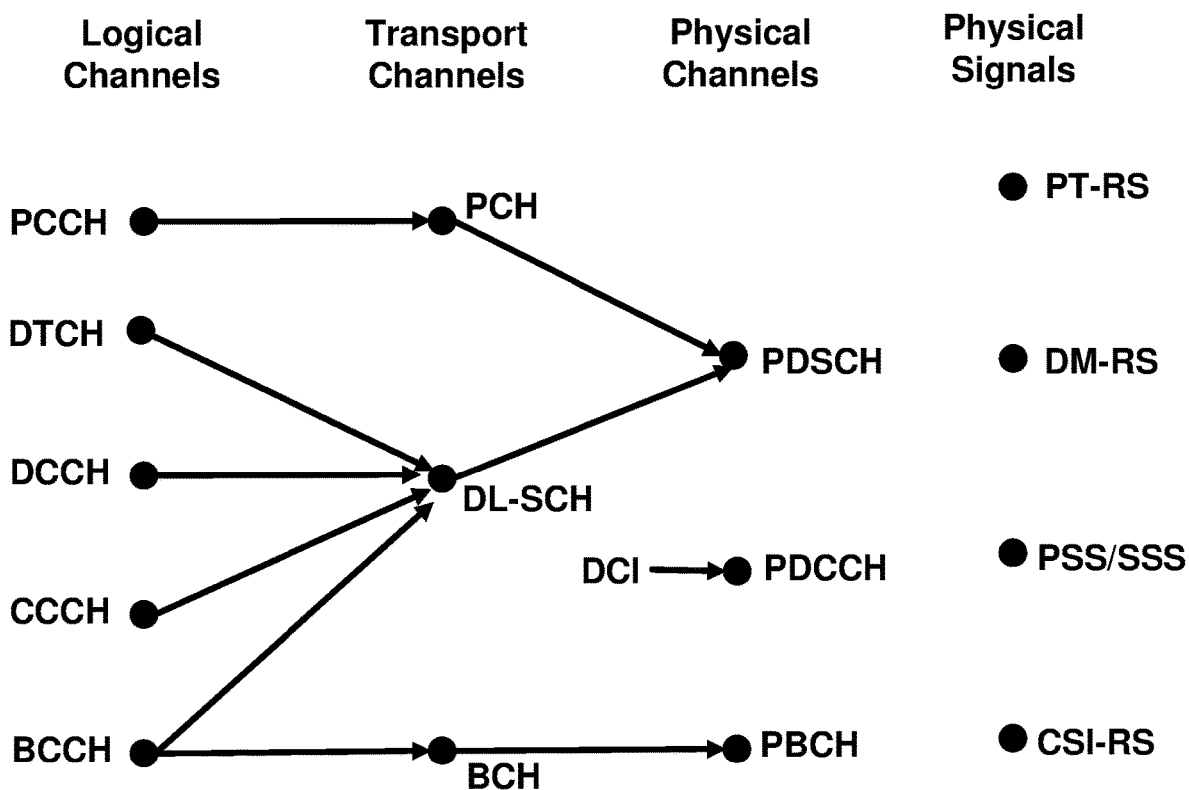
FIG. 5A shows example mapping of channels between layers of the protocol stack and different physical signals in downlink in accordance with several of various embodiments of the present disclosure.
Figure 5B:
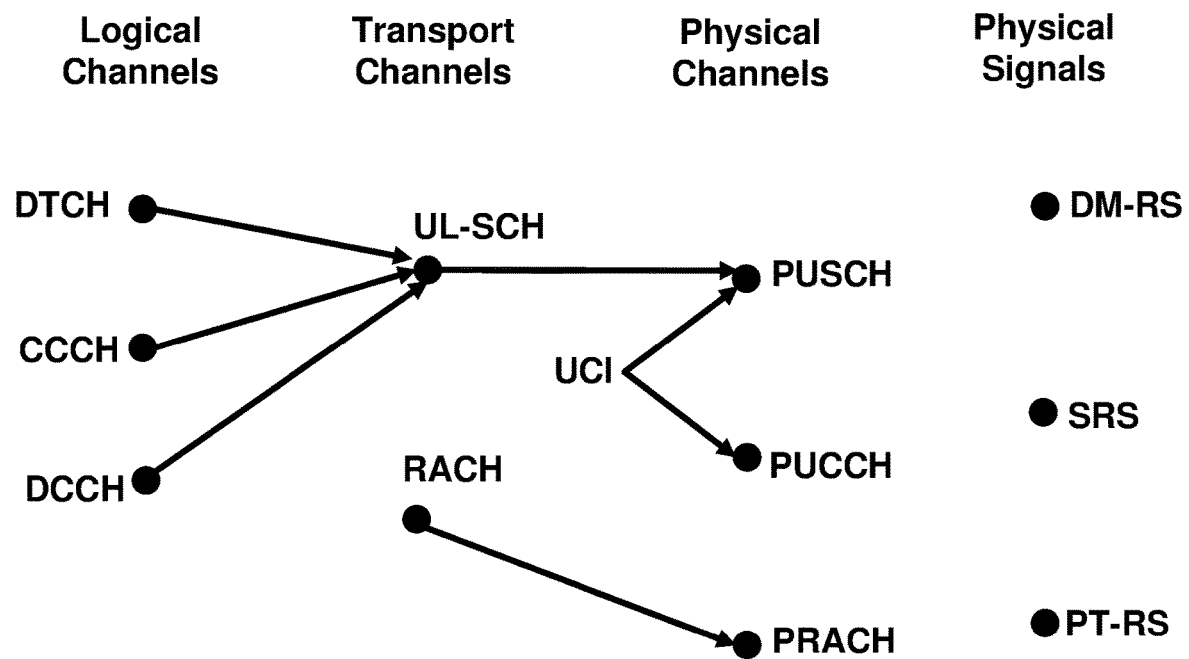
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
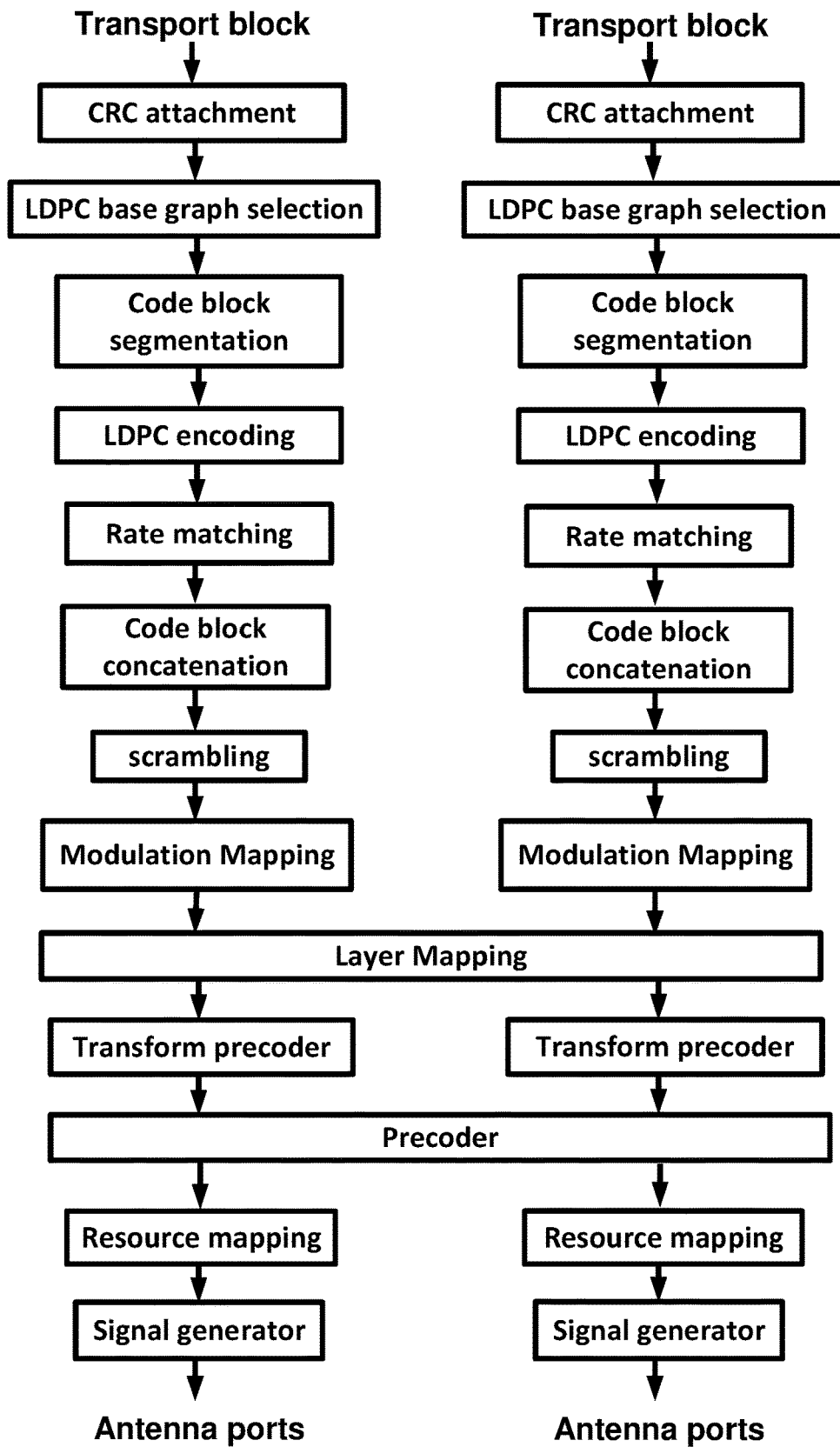
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
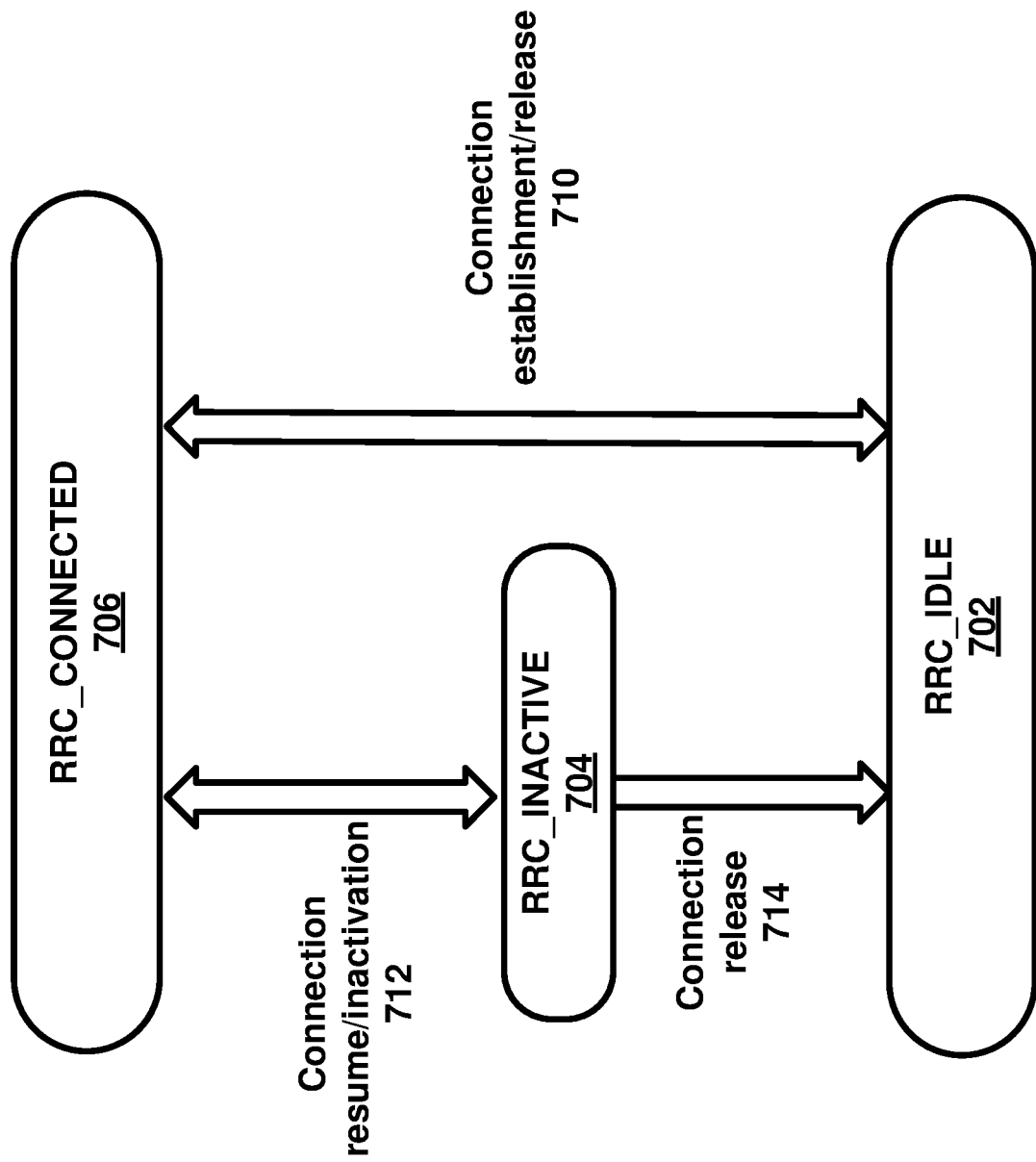
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\alpha f=2^\mu$, 15 KHz (μ=0, 1, 2, . . . ). Example subcarrier spacings used in NR include 15 KHz (μ=0), 30 KHz (μ=1), 60 KHz (μ=2), 120 KHz (μ=3) and 240 KHz (μ=4). As discussed before, a duration of OFDM symbol is inversely proportional to the subcarrier spacing and therefor OFDM symbol duration may depend on the numerology (e.g. the p value).

Figure 8:
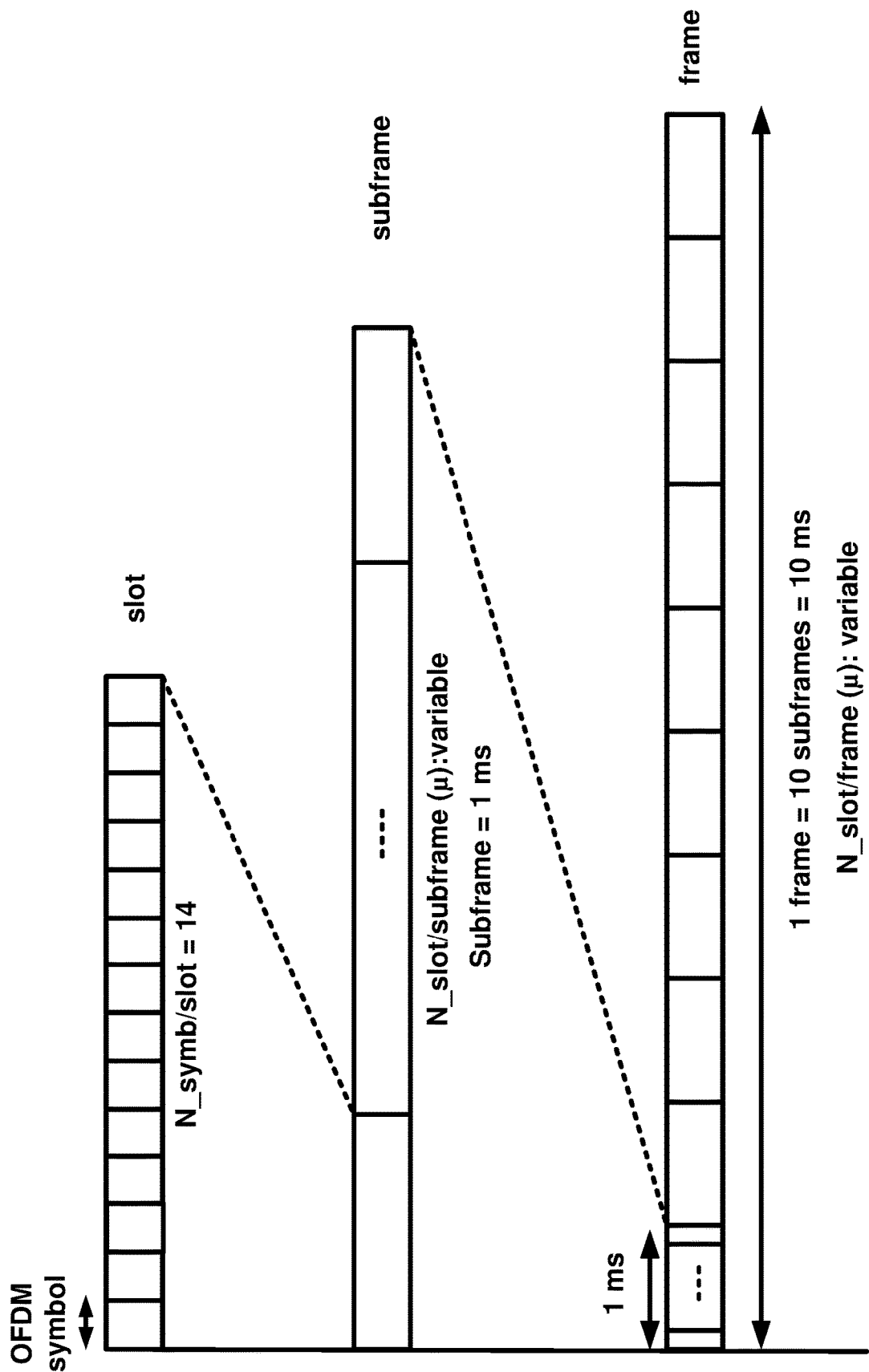
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of p and may generally expressed as $N_{slot}^{subframe,\mu}$ and the number of symbols per subframe may be expressed as $N_{symb}^{subframe,\mu}=N_{symb}^{slot}N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{subframe,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
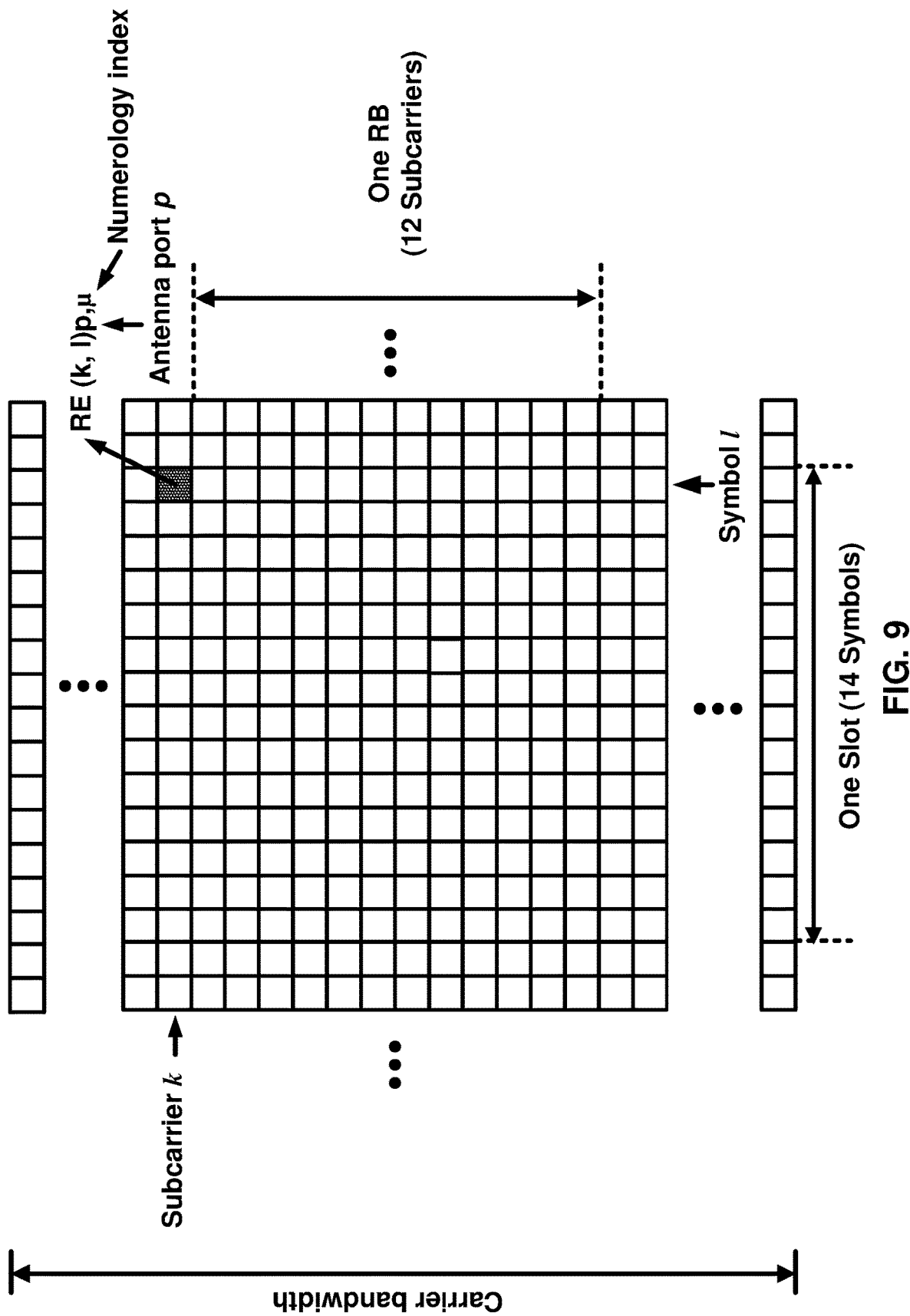
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration p may be uniquely identified by (k, l)$_{p,\mu}$ where k is the index of a subcarrier in the frequency domain and 1 may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g. shrink during period of low activity to save power); the location of the transmit and/or receive bandwidth may move in the frequency domain (e.g. to increase scheduling flexibility); and the subcarrier spacing of the transmit or receive bandwidth may change (e.g. to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
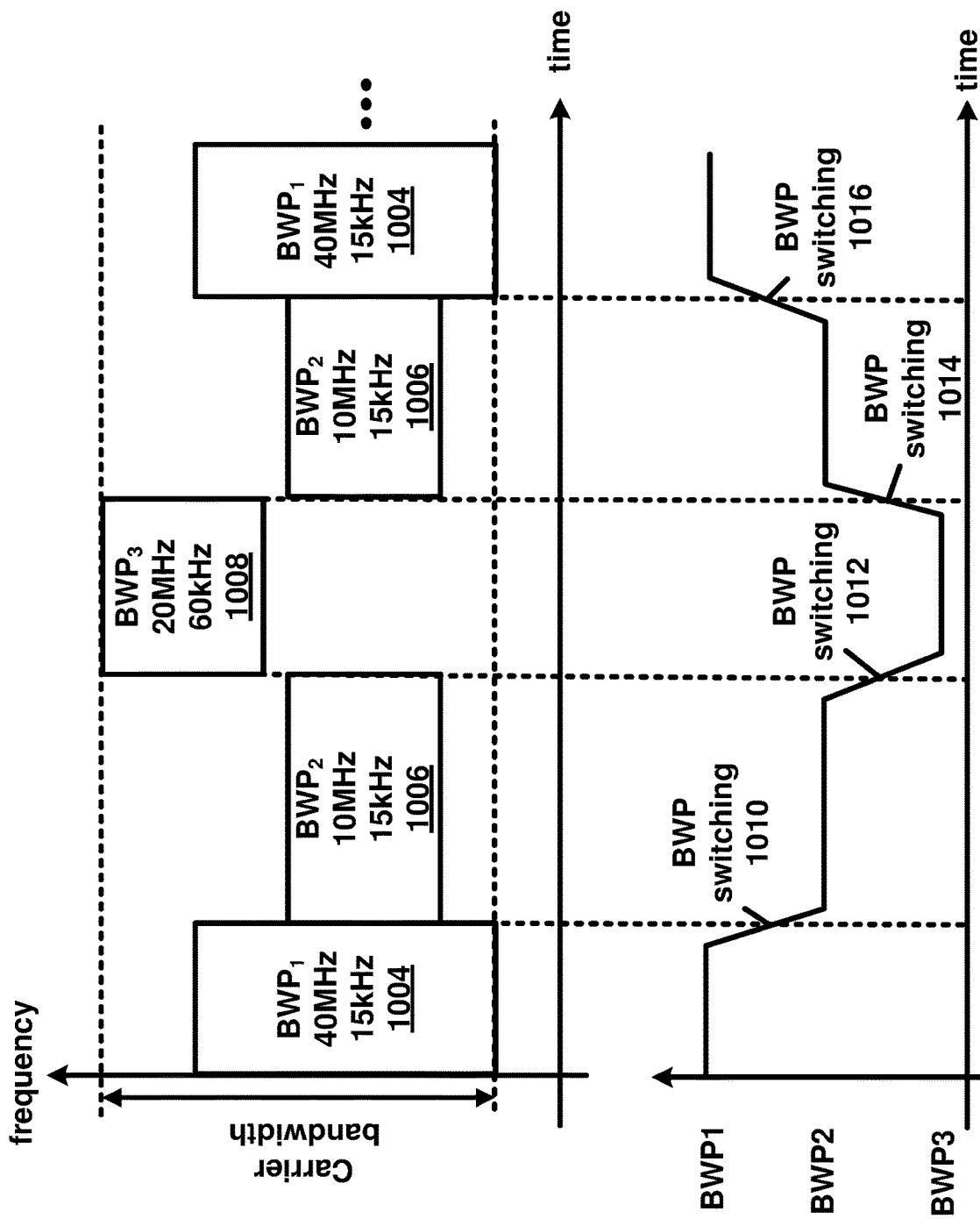
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
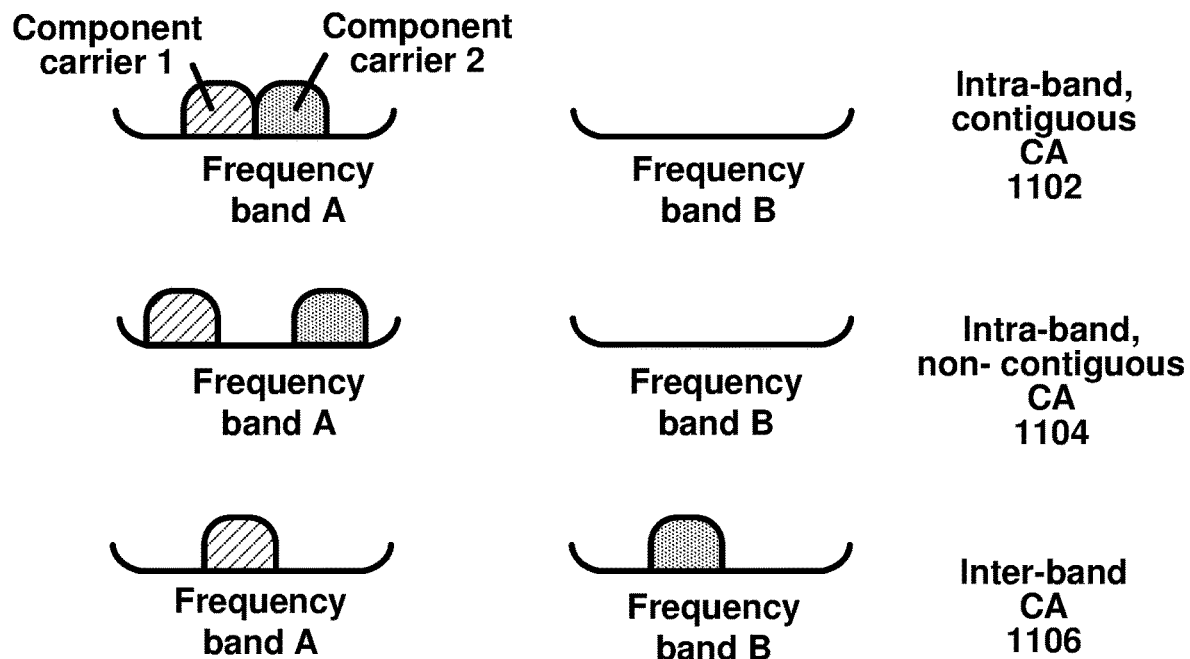
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
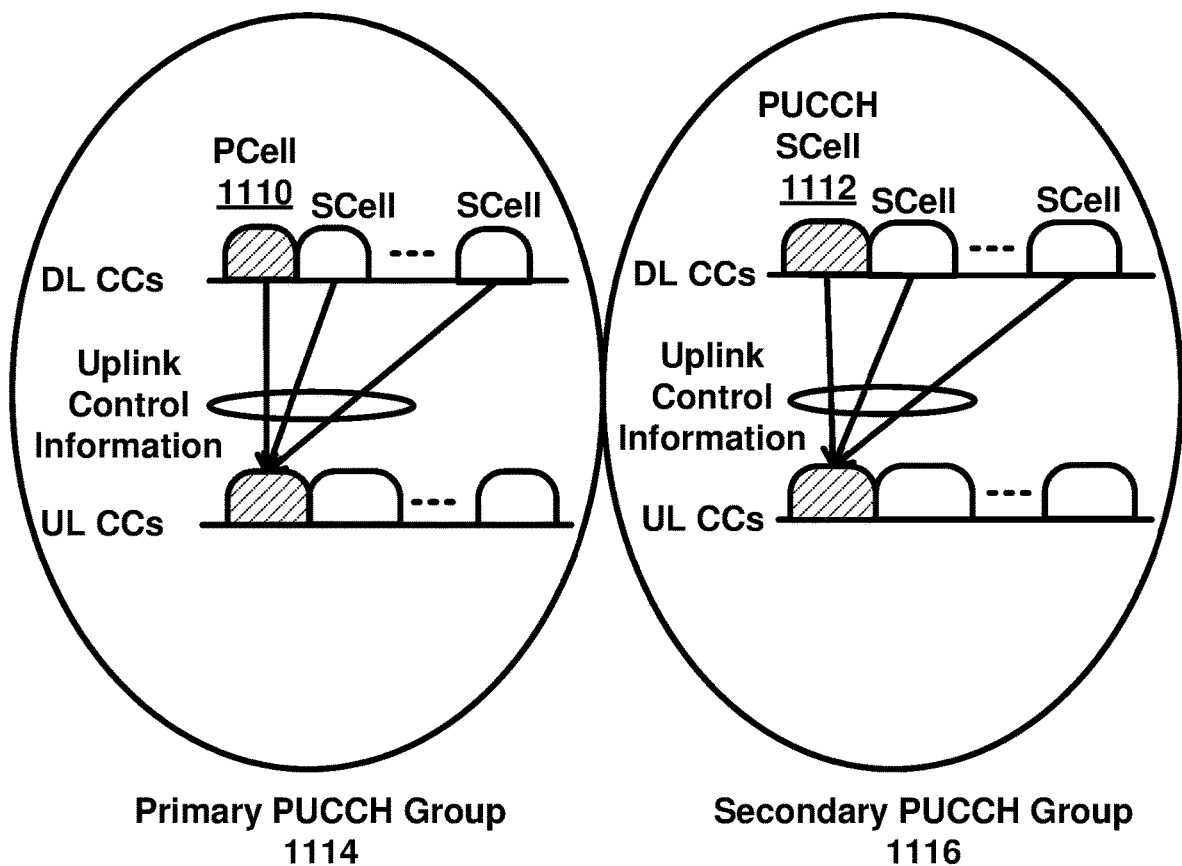
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. The are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
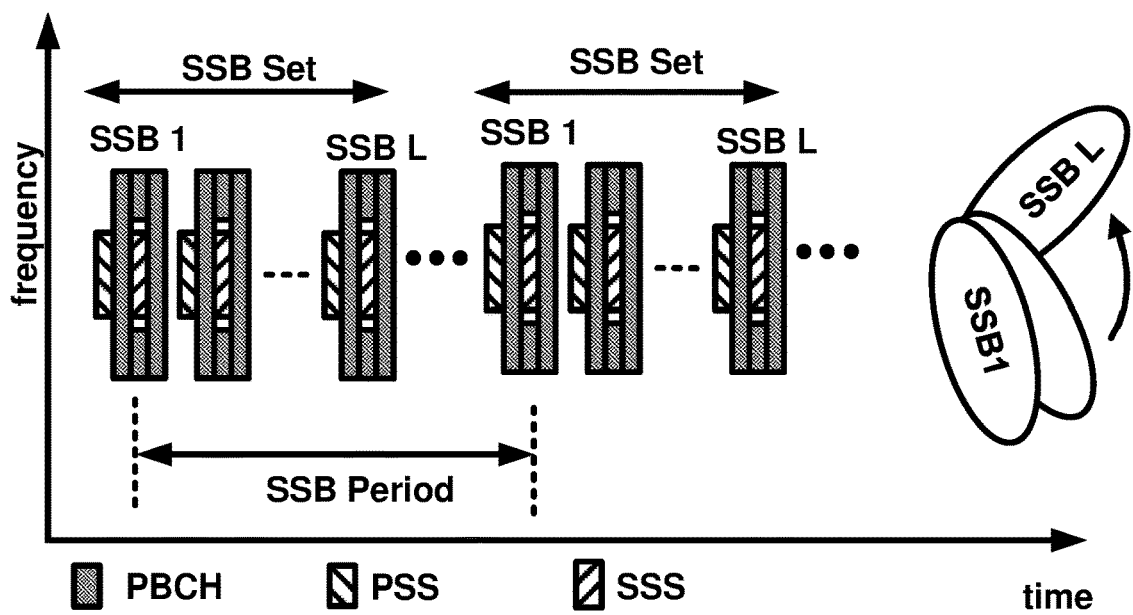
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
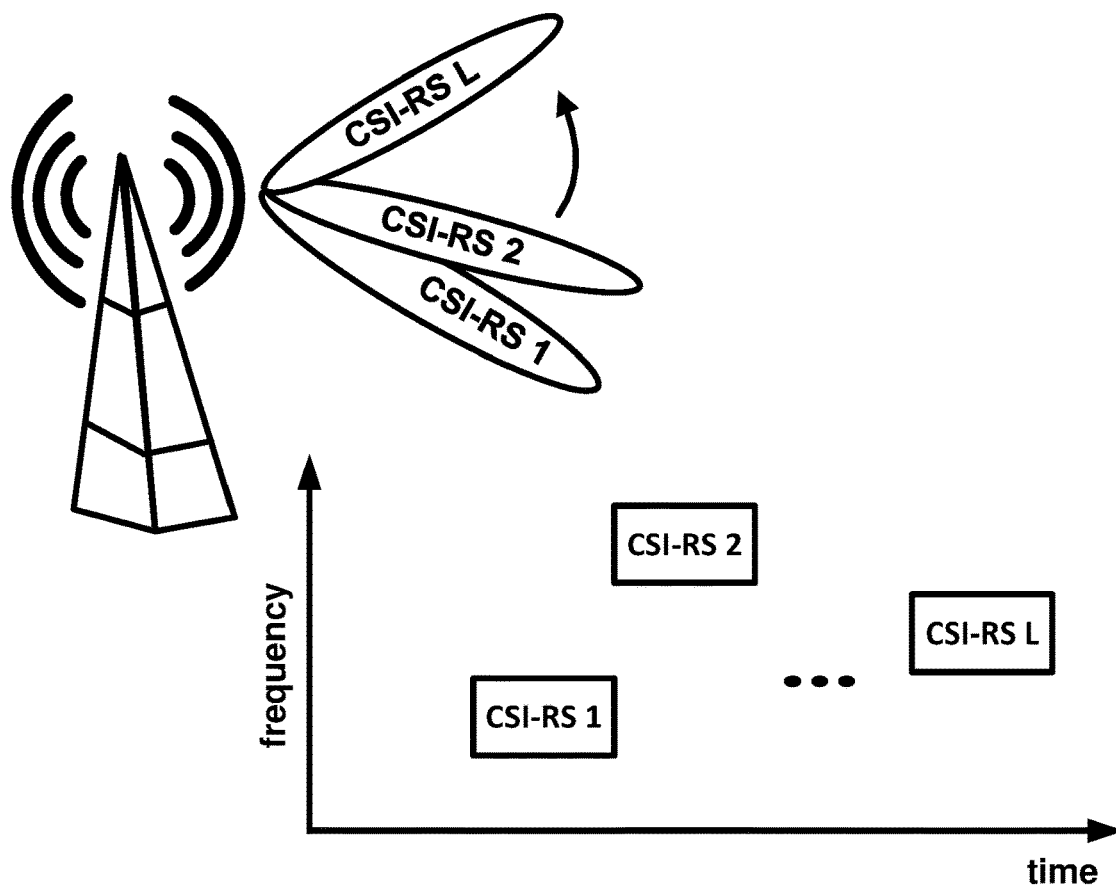
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
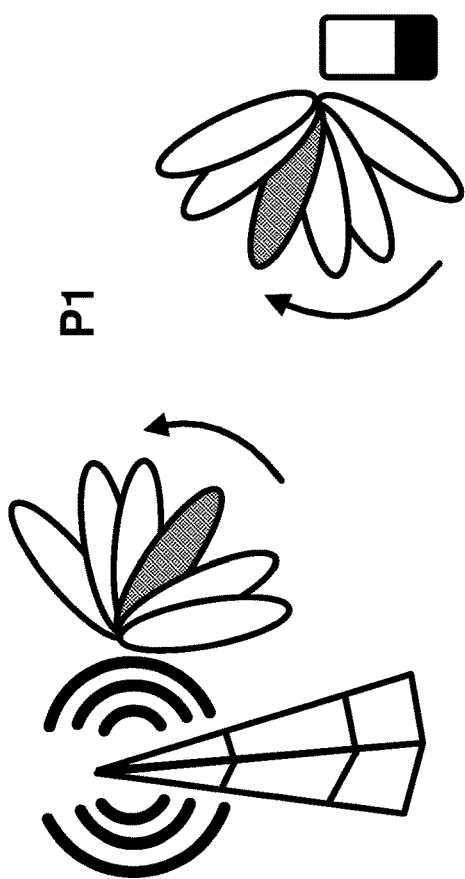
FIG. 14A, FIG. 14B and FIG. 14C show example beam management processes in accordance with several of various embodiments of the present disclosure.
Figure 14C:
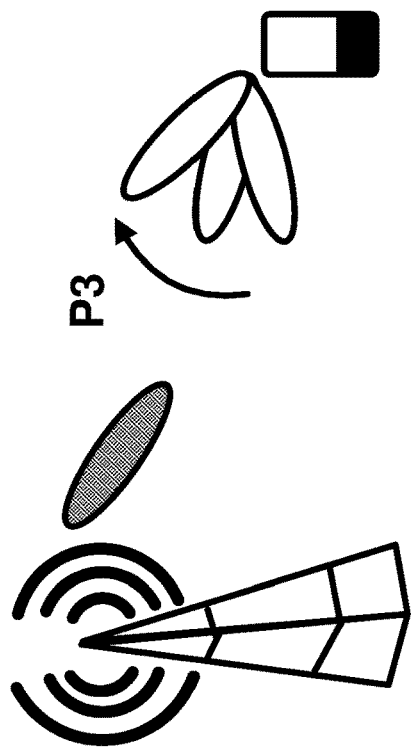
Figure 14B:
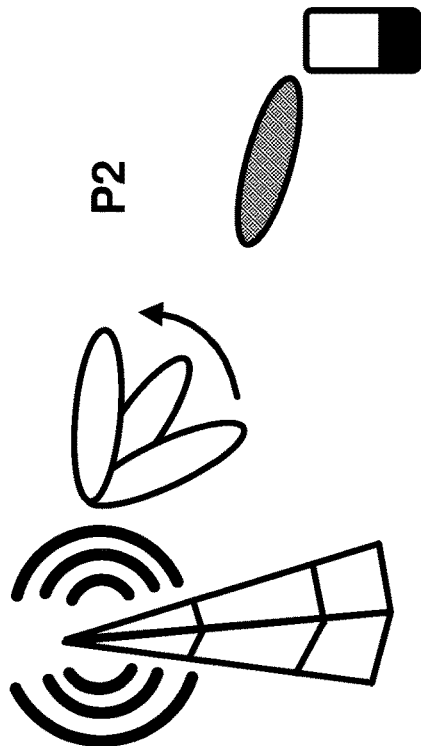

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
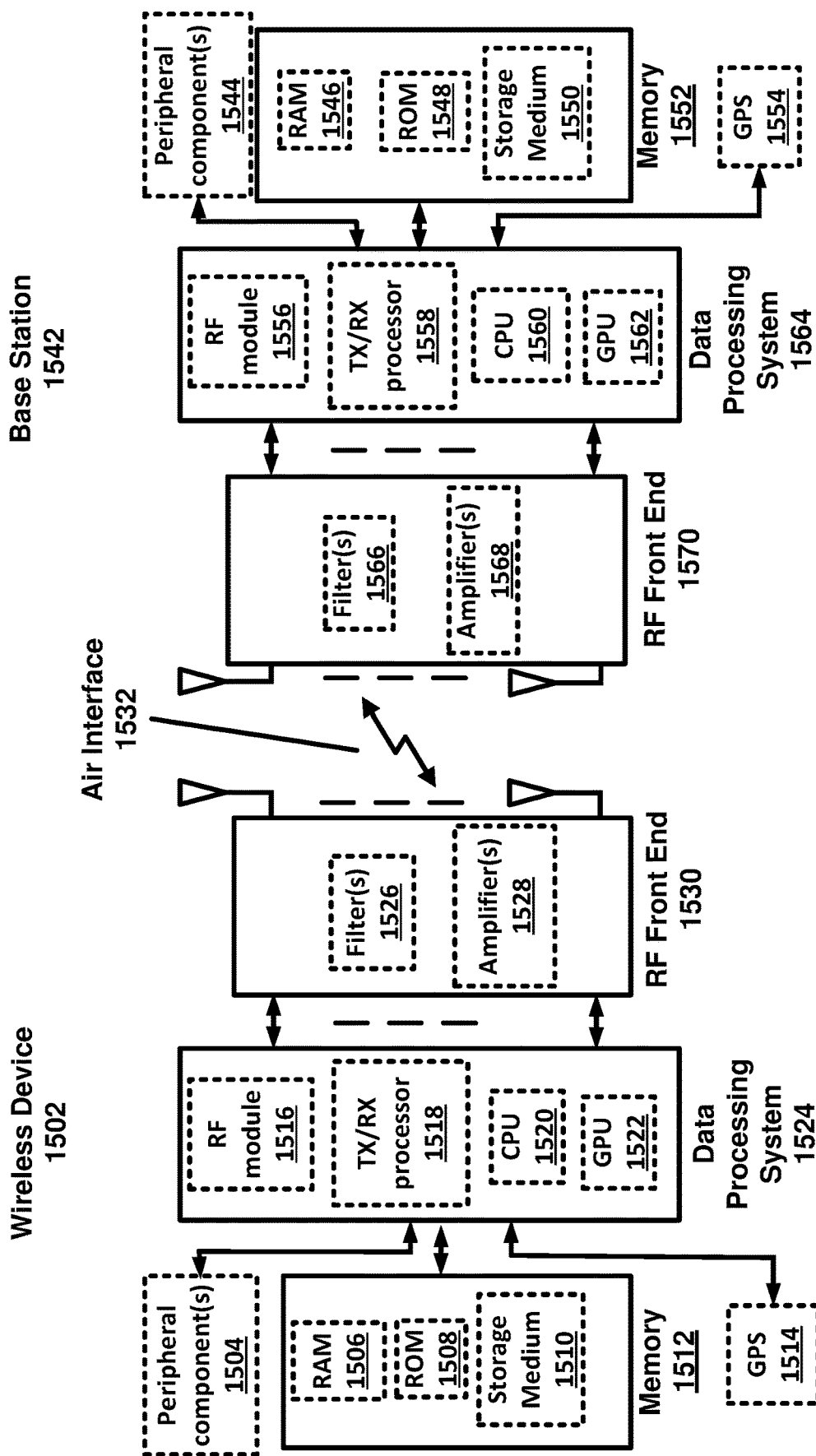
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier (s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively.

The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, a DCI format 2_1 may be used for notifying the PRB(s) and OFDM symbol(s) where UE may assume no transmission is intended for the UE. The following information may be transmitted by means of the DCI format 2_1 with CRC scrambled by INT-RNTI: Pre-emption indication 1, Pre-emption indication 2, . . . , Pre-emption indication N. The size of DCI format 21 may be configurable by higher layers up to 126 bits. A pre-emption indication may be 14 bits.

In an example, a UE may receive configuration parameters comprising a DownlinkPreemption IE. The UE may be configured with an INT-RNTI provided by int-RNTI for monitoring PDCCH conveying DCI format 2_1. The UE may be additionally configured with: a set of serving cells by int-ConfigurationPerServingCell that includes a set of serving cell indexes provided by corresponding servingCellId and a corresponding set of locations for fields in DCI format 2_1 by positionInDCI; an information payload size for DCI format 2_1 by dci-PayloadSize; an indication granularity for time-frequency resources by timeFrequencySet.

In an example, if a UE detects a DCI format 2_1 for a serving cell from the configured set of serving cells, the UE may assume that no transmission to the UE is present in PRBs and in symbols that are indicated by the DCI format 2_1, from a set of PRBs and a set of symbols of the last monitoring period. The indication by the DCI format 2_1 may not be applicable to receptions of SS/PBCH blocks.

In an example, the set of PRBs may be equal to the active DL BWP as defined in Subclause 12 and may include $B_{INT}$ PRBs. In an example, if a UE detects a DCI format 2_1 in a PDCCH transmitted in a CORESET in a slot, the set of symbols may be the last $N_{symb}^{slot} \cdot T_{INT} \cdot 2^{\mu-\mu_{INT}}$ symbols prior to the first symbol of the CORESET in the slot where $T_{INT}$ may be the PDCCH monitoring periodicity provided by the value of monitoringSlotPeriodicityAndOffset $N_{symb}^{slot}$ is the number of symbols per slot, y may be the SCS configuration for a serving cell with mapping to a respective field in the DCI format 2_1, $\mu_{INT}$ may be the SCS configuration of the DL BWP where the UE may receive the PDCCH with the DCI format 2_1. In an example, if the UE is provided tdd-UL-DL-ConfigurationCommon, symbols indicated as uplink by tdd-UL-DL-ConfigurationCommon may be excluded from the last $N_{symb}^{slot} \cdot T_{INT} \cdot 2^{\mu-\mu_{INT}}$ symbols prior to the first symbol of the CORESET in the slot. The resulting set of symbols may include a number of symbols that is denoted as $N_{INT}$.

In an example, the UE may be provided the indication granularity for the set of PRBs and for the set of symbols by timeFrequencySet. In an example, if the value of timeFrequencySet is 0, 14 bits of a field in DCI format 2_1 may have a one-to-one mapping with 14 groups of consecutive symbols from the set of symbols where each of the first $N_{INT}-\lfloor N_{INT}/14 \rfloor \cdot 14$ symbol groups includes $\lceil N_{INT}/14 \rceil$ symbols, each of the last $14-N_{INT}+\lfloor N_{INT}/14 \rfloor \cdot 14$ symbol groups may include $\lfloor N_{INT}/14 \rfloor$ symbols, a bit value of 0 may indicate transmission to the UE in the corresponding symbol group and a bit value of 1 may indicate no transmission to the UE in the corresponding symbol group.

In an example, if the value of timeFrequencySet is 1, 7 pairs of bits of a field in the DCI format 2_1 may have a one-to-one mapping with 7 groups of consecutive symbols where each of the first $N_{INT}-\lfloor N_{INT}/7 \rfloor \cdot 7$ symbol groups includes $\lceil N_{INT}/7 \rceil$ symbols, each of the last $7-N_{INT}+\lfloor N_{INT}/7 \rfloor \cdot 7$ symbol groups may include $\lfloor N_{INT}/7 \rfloor$ symbols, a first bit in a pair of bits for a symbol group may be applicable to the subset of first $\lceil B_{INT}/2 \rceil$ PRBs from the set of $B_{INT}$ PRBs, a second bit in the pair of bits for the symbol group may be applicable to the subset of last $\lfloor B_{INT}/2 \rfloor$ PRBs from the set of $B_{INT}$ PRBs, a bit value of 0 may indicate transmission to the UE in the corresponding symbol group and subset of PRBs, and a bit value of 1 may indicate no transmission to the UE in the corresponding symbol group and subset of PRBs.

In an example, an IE DownlinkPreemption may be used to configure the UE to monitor PDCCH for the INT-RNTI (interruption). The DownlinkPreemption may comprise one or more of following parameters: a dci-PayloadSize parameter indicating total length of the DCI payload scrambled with INT-RNTI; an int-ConfigurationPerServingCell parameter indicating (per serving cell) the position of the 14 bit INT values inside the DCI payload; an int-RNTI parameter indicating RNTI used for indication pre-emption in DL; a timeFrequencySet parameter indicating set selection for DL-preemption indication, wherein the set may determine how the UE may interpret the DL preemption DCI payload; and a positionInDCI parameter indicating starting position (in number of bit) of the 14 bit INT value applicable for this serving cell (servingCellId) within the DCI payload wherein the positionInDCI may be multiples of 14 (bit).

In an example, in conjunction with a UL/DL carrier pair (FDD band) or a bidirectional carrier (TDD band), a UE may be configured with additional, Supplementary Uplink (SUL).

In case of Supplementary Uplink (SUL), the UE may be configured with a plurality (e.g., 2) ULs for one DL of the same cell, and uplink transmissions on those ULs may be controlled by the network to avoid overlapping PUSCH/PUCCH transmissions in time. Overlapping transmissions on PUSCH may be avoided through scheduling while overlapping transmissions on PUCCH may be avoided through configuration (e.g., PUCCH may be configured for only one of the ULs of the cell).

Figure 16:
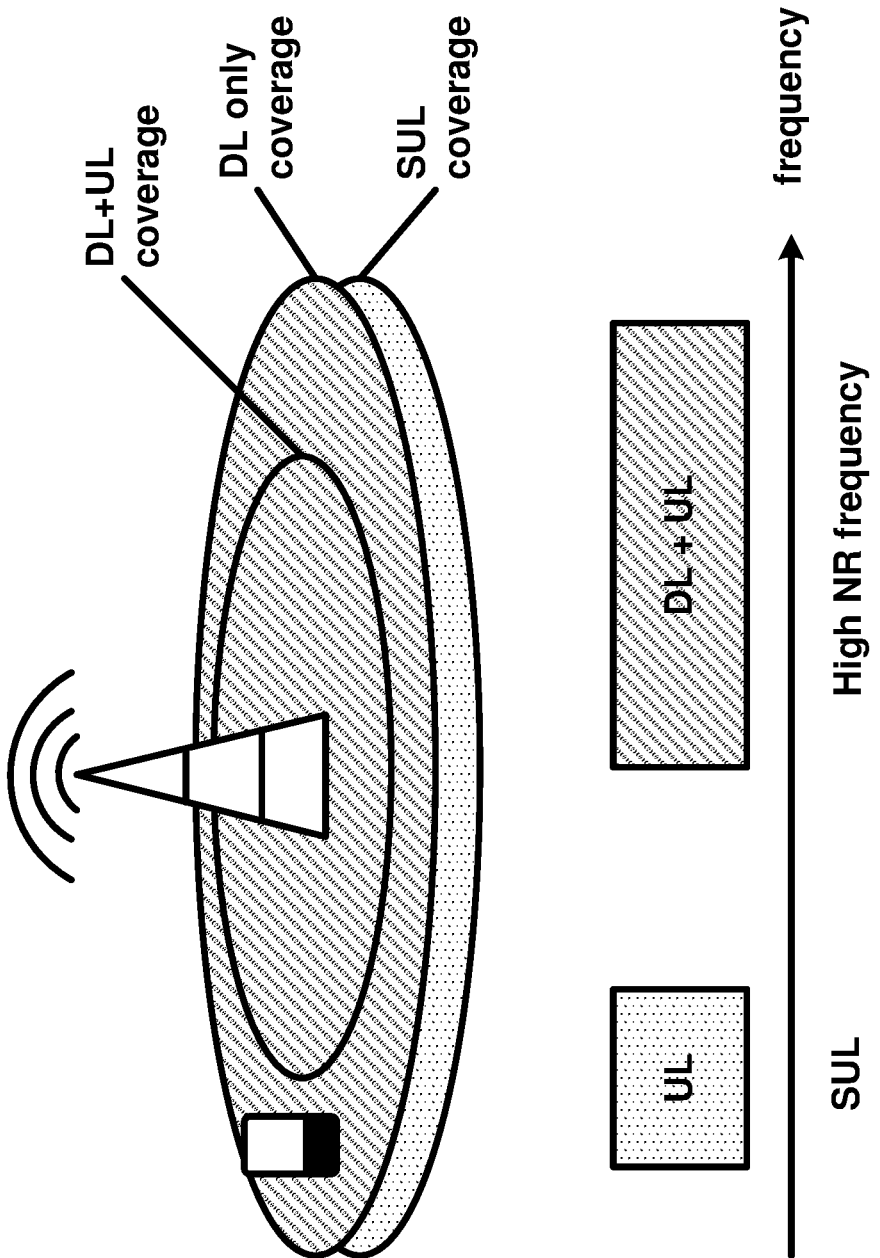
FIG. 16 shows an example operation of normal uplink carrier and supplementary uplink carrier in accordance with several of various embodiments of the present disclosure.

To improve UL coverage for high frequency scenarios, SUL may be configured. With SUL, the UE may be configured with 2 ULs for one DL of the same cell as depicted in FIG. 16.

In an example, PDCCH may be used for UL cancelation indication. In an example, based on detecting an UL cancelation indication, the wireless device may stop an uplink transmission without resuming. In an example, the UL transmission may include one or more of dynamically scheduled UL transmissions (e.g., PUSCH, PUCCH, and SRS), semi-persistent UL transmissions (e.g., PUSCH, PUCCH, SRS), Periodic UL transmissions (e.g., configured grant PUSCH, PUCCH, SRS) and PRACH.

In an example, the UL cancellation indication may be indicated using a group common DCI.

In an example, a time/frequency region may be provided in the cancelation indication DCI for a group of UEs to derive the UL cancelation behavior. In an example, UL cancellation indication may be separately provided for each UE in a group common DCI.

In an example, for a UE supporting UL cancellation, the UE may be configured with slot-level or mini-slot level monitoring for UL cancellation indication monitoring. For mini-slot level monitoring, monitoring occasion and number for blind decoding for UL cancellation indication may be configurable.

In an example, upon receiving UL cancellation indication, UE may determine the starting position of cancelled time resources based on one or more of the following: slot and/or symbol offset indicated by DCI relative to the ending symbol PDCCH CORESET carrying the UL cancellation indication plus the minimum UE processing time for cancelation operation; slot and/or symbol offset configured by RRC relative to the ending symbol PDCCH CORESET carrying the UL cancellation indication plus the minimum UE processing time for cancelation operation; and symbol-level offset implicitly determined based on the ending symbol PDCCH CORESET carrying the UL cancellation indication plus the minimum UE processing time for cancelation operation.

In an example, a wireless device may apply the UL cancellation in one slot. The UE may cancel the UL transmission in one slot given by UL cancellation indication until the boundary of the slot. In an example, UL cancellation may be applied for multiple slots.

In an example, for UL transmission with associated PDCCH, UE may start UL CI monitoring after the PDCCH is decoded. In an example, UE may monitor UL CI at least at the latest monitoring occasion ending no later than X symbols before the start of the UL transmission, and X may be related to UL CI processing time. For UL transmission without associated PDCCH, UE may monitor UL CI at least at the latest monitoring occasion that ends no later than X symbols before the start of the UL transmission, In an example, the RRC configuration parameters for UL cancellation indication may indicate a new RNTI (e.g. CI-RNTI) for UL Cancellation Indication. The DCI payload size for UL CI may be configured by RRC.

In an example, for UL transmissions with and without associated PDCCH, UE may start monitoring UL CI at least at the latest monitoring occasion ending no later than X symbols before the start of the UL transmission, and X may be related to UL CI processing time. The UE may stop monitoring UL CI from X symbols before the end of relevant UL transmission, and X may be related to UL CI processing time.

In an example, a wireless device may be configured with a plurality of carriers, for example a normal carrier (NUL) and a supplementary uplink (SUL). An example is shown in FIG. 16. The SUL may be configured to improve uplink coverage for high frequency scenarios. In case of a Supplementary Uplink, the wireless device may be configured with 2 ULs for one DL of the same cell, and uplink transmissions on those two ULs may be controlled by the network (for example to avoid overlapping PUSCH/PUCCH transmissions in time). The overlapping transmissions on PUSCH may be avoided through scheduling. The overlapping transmissions on PUCCH are avoided through configuration. Initial access may be supported in each of the uplink. In an example, overlapping PUSCH/PUCCH transmissions of uplink carriers in time may be possible.

Example embodiments may operate considering different traffic/service types including enhanced mobile broadband (eMBB) traffic/service type and ultra-reliable low-latency communications (URLLC) traffic/service types. The eMBB traffic/service type may be related to high data rate applications where latency and reliability requirements may not be as strict as the data rate requirements. The URLLC applications may have strict requirements on latency and reliability and may require comparatively lower data rates than the eMBB traffic/service type.

Figure 17:
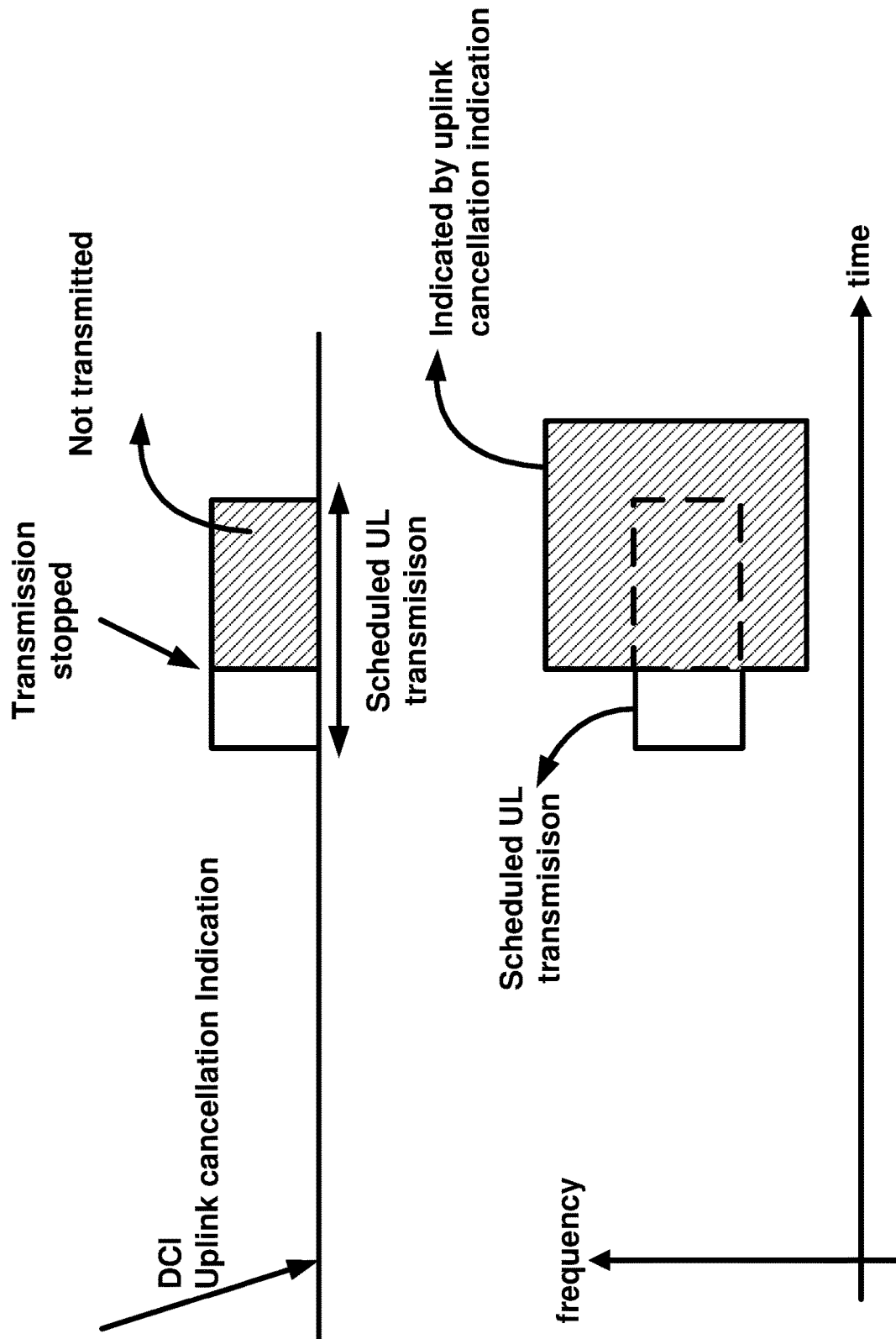
FIG. 17 shows an example uplink cancellation process in accordance with several of various embodiments of the present disclosure.

In example embodiments and as shown in FIG. 17, a wireless device may be scheduled with an uplink transmission and may stop the uplink transmission due to receiving an uplink cancellation indication indicating radio resources that overlap with the uplink transmission. In an example, in response to the radio resources indicated by the uplink cancellation indication staring before the scheduled the resources, the wireless device may not start the scheduled uplink transmission. In an example the scheduled uplink transmission may correspond to an eMBB traffic/service type and the base station may transmit the uplink cancellation indication so that the resources indicated by the uplink cancellation may be used for scheduling uplink transmissions (e.g., transport blocks) corresponding to URLLC traffic/service type. As shown in FIG. 17, the wireless device may start its scheduled uplink transmission due to uplink cancellation indication indicating resources that has overlap with the scheduled resources. The wireless device may not resume its transmission of the scheduled uplink transmission even if the cancelled resources end before the scheduled uplink transmission ends. The wireless device may receive a DCI, associated with an RNTI for uplink cancellation indication, comprising a plurality of uplink cancellation indications including an uplink cancellation indication related to the scheduled uplink transmission. The DCI may determine a relevant uplink cancellation indication based on one or more configuration parameters (e.g., uplink cancellation indication configuration parameters).

Uplink cancellation mechanism may be used by a base station to cancel scheduled uplink transmissions for one or more wireless devices. The resources of the scheduled uplink transmissions may be used for other uplink transmissions that have strict delay and reliability requirements (for example, in URLLC applications). The uplink cancellation mechanisms may be indicated using a group common downlink control information comprising a plurality of uplink cancellation indications. Existing technologies for determination of a relevant uplink cancellation indication among a plurality of uplink cancellation indications, by the wireless device, may be inefficient when a serving cell is configured with a plurality of uplink carriers and/or when an uplink carrier is configured with a plurality of BWPs (e.g., a plurality of simultaneously active BWPs). There is a need to enhance the existing uplink cancellation indication technologies when a serving cell is configured with a plurality of uplink carriers and/or when an uplink carrier is configured with a plurality of BWPs (e.g., a plurality of simultaneously active BWPs). Example embodiments enhance the uplink cancellation indication and determination processes.

In an example, a wireless device may receive one or more messages comprising configuration parameters. The one or more messages may comprise one or more RRC messages. The one or more parameters may comprise configuration parameters of one or more cells comprising a serving cell. The configuration parameters of the serving cell may comprise a serving cell index. The serving cell may be configured with a plurality of uplink carriers. The plurality of uplink carriers may comprise a normal uplink carrier and a supplementary uplink carrier. An uplink carrier, in the plurality of uplink carriers, may be configured with a plurality of BWPs. In an example, one or more uplink carrier of the plurality of uplink carriers may be active. In an example, one or more BWPs of a plurality of BWPs of an uplink carrier may be simultaneously active. An uplink carrier or a BWP of an uplink carrier may be active when normal transmission processes can occur on the uplink carrier and/or on the BWP of the uplink carrier.

I an example, the one or more messages may comprise uplink cancellation indication configuration parameters. The uplink cancellation indication configuration parameters may comprise a radio network temporary identifier (RNTI). The RNTI may be called a cancellation indication RNTI (e.g., CI-RNTI).

In an example embodiment as shown in FIG. 19, the uplink cancellation configuration parameters may comprise a sequence of parameters/information elements (IEs), wherein an IE in the sequence of one or more IEs may comprise: an identifier of a serving cell, a first position, in a downlink control information, for a first uplink carrier of a serving cell and a second position, in a downlink control information, for a second uplink carrier of the serving cell. In an example, the first uplink carrier may be one of a normal uplink carrier and a supplementary uplink carrier. In an example, the second uplink carrier, different from the first uplink carrier, may be one of the normal uplink carrier and the supplementary uplink carrier. In an example, the first position may indicate an integer between one and a payload size of the download control information, wherein the payload size may be a constant number and/or may be configurable (e.g., using an RRC parameter). In an example, the second position may indicate an integer between one and a payload size of the download control information. The first position may indicate a first bit in the plurality of bits in the downlink control information. The first bit may indicate a starting bit of an uplink cancellation indication. The second position may indicate a second bit in the plurality of bits of the downlink control information. The second bit may indicate a starting bit of an uplink cancellation indication. In an example, the size of the uplink cancellation may be a fixed number. By determining a starting bit of an uplink cancellation indication, the wireless device may determine an uplink cancellation indication based on the size of the uplink cancellation indication. For example, the last bit of an uplink cancellation indication may be determined based on the staring bit of the uplink cancellation indication and the size of the uplink cancellation indication.

In an example embodiment, the uplink cancellation configuration parameters may comprise a sequence of parameters/information elements (IEs), wherein an IE in the sequence of one or more IEs may comprise: an identifier of a serving cell, a position, in a downlink control information, for a first uplink carrier of a plurality of uplink carrier of the serving cell. In an example, the first uplink carrier may be one of a normal uplink carrier and a supplementary uplink carrier. In an example, the position may indicate an integer between one and a payload size of the download control information, wherein the payload size may be a constant number and/or may be configurable (e.g., using an RRC parameter). The position may indicate a first bit in the plurality of bits in the downlink control information. The first bit may indicate a starting bit of an uplink cancellation indication. In an example, the size of the uplink cancellation may be a fixed number. By determining a starting bit of an uplink cancellation indication, the wireless device may determine an uplink cancellation indication based on the size of the uplink cancellation indication. For example, the last bit of an uplink cancellation indication may be determined based on the staring bit of the uplink cancellation indication and the size of the uplink cancellation indication.

Figure 18:
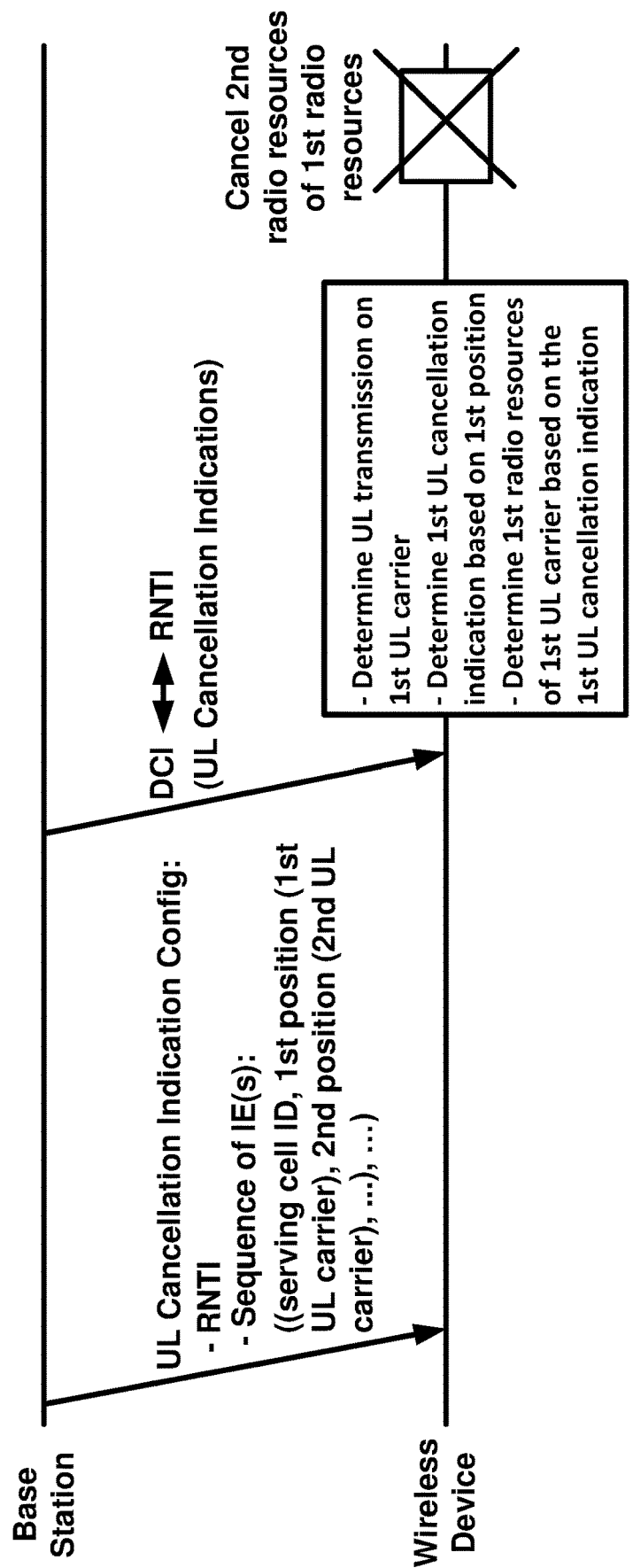
FIG. 18 shows an example process in accordance with several of various embodiments of the present disclosure.

As shown in FIG. 18, the wireless device may receive a downlink control information, associated with the RNTI (e.g., CI-RNTI), wherein the downlink control information may comprise a plurality of uplink cancellation indications. In an example, the plurality of uplink cancellation indications may be for a plurality of cells. In an example, the plurality of uplink cancellation indications may be for a plurality of uplink carriers of a plurality of cells. The downlink control information may be a group common DCI and the wireless device may receive the downlink control information in a common search space of a control channel.

As shown in FIG. 18, the wireless device may determine that an uplink transmission is scheduled on the first uplink carrier of the serving cell. For example, the wireless device may determine that a dynamically scheduled PUSCH or a PUSCH based on a configured grant or a SRS or another signal/channel is scheduled for transmission via the first uplink carrier of the serving cell. The wireless device may determine, based on the downlink control information and the first position (e.g., first position associated with the first uplink carrier) a first uplink cancellation indication in the plurality of uplink cancellation indications of the downlink control information. In an example, based on the determination that uplink transmission is scheduled on the first uplink carrier of the serving cell, the wireless device may determine, based on the downlink control information and the first position (e.g., first position associated with the first uplink carrier) a first uplink cancellation indication in the plurality of uplink cancellation indications of the downlink control information.

As shown in FIG. 18, the wireless device may determine, based on the first uplink cancellation indication, first radio resources of the first uplink carrier of the serving cell. The wireless device may determine the first radio resources based on the first uplink cancellation indication and one or more configuration parameters (e.g., one or more uplink cancellation indication configuration parameters). The wireless device may determine, based on the first uplink cancellation indication, radio resources (e.g., resource blocks and/or symbols) of the first uplink carrier of the serving cell for uplink cancellation, wherein the radio resources comprise the first radio resources.

As shown in FIG. 18, the wireless device may cancel second radio resources of the first radio resource based on the determining the first radio resources. In an example, the radio resources of the scheduled transmission, on the first uplink carrier of the servicing cell, may comprise the second radio resources. In an example, the second radio resources of the first radio resources may be radio resources among those indicated for uplink cancellation that have overlap with the scheduled uplink transmission on the first uplink carrier of the serving cell. In an example, the cancelling the uplink transmission on the second radio resources may comprise stopping transmission of the scheduled uplink transmission on the second radio resources. In an example, the cancelling the uplink transmission on the second radio resources may comprise stopping transmission of the scheduled uplink transmission at an earliest symbol of the second radio resources and in the midst of the scheduled uplink transmission. In an example, the cancelling the uplink transmission on the second radio resources may comprise not transmitting the scheduled uplink transmission.

In an example embodiment as shown in FIG. 21, the uplink cancellation configuration parameters may comprise a sequence of one or more parameters/information elements (IEs), wherein an IE in the sequence of one or more IEs may comprise: a first identifier of a serving cell, a second identifier of a BWP of the serving cell, a position, in a downlink control information, for the BWP of the serving cell. In an example, the position may indicate an integer between one and a payload size of the download control information, wherein the payload size may be a constant number and/or may be configurable (e.g., using an RRC parameter). The position may indicate a bit in the plurality of bits in the downlink control information. The bit may indicate a starting bit of an uplink cancellation indication. In an example, the size of the uplink cancellation indication may be a fixed number. By determining a starting bit of an uplink cancellation indication, the wireless device may determine an uplink cancellation indication based on the size of the uplink cancellation indication. For example, the last bit of an uplink cancellation indication may be determined based on the staring bit of the uplink cancellation indication and the size of the uplink cancellation indication.

Figure 20:
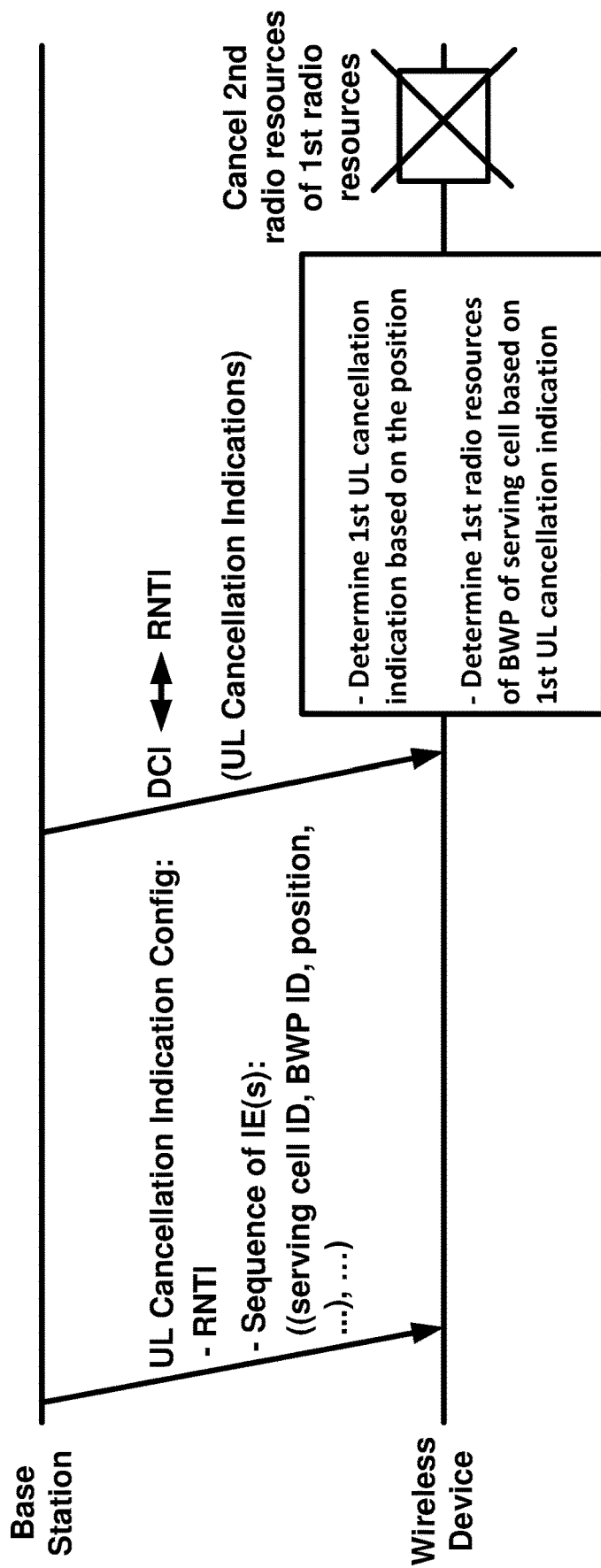
FIG. 20 shows an example process in accordance with several of various embodiments of the present disclosure.

As shown in FIG. 20, the wireless device may receive a downlink control information, associated with the RNTI (e.g., CI-RNTI), wherein the downlink control information may comprise a plurality of uplink cancellation indications. In an example, the plurality of uplink cancellations may be for a plurality of cells. In an example, the plurality of uplink cancellations may be for a plurality of BWPs of a plurality of cell. The downlink control information may be a group common DCI and the wireless device may receive the downlink control information in a common search space of a control channel.

As shown in FIG. 20, The wireless device may determine, based on the downlink control information and the position a first uplink cancellation indication in the plurality of uplink cancellation indications of the downlink control information.

As shown in FIG. 20, the wireless device may determine, based on the first uplink cancellation indication, first radio resources of the BWP of the serving cell. The wireless device may determine the first radio resources based on the first uplink cancellation indication and one or more configuration parameters (e.g., uplink cancellation indication configuration parameters). The wireless device may determine, based on the first uplink cancellation indication, radio resources (e.g., resource blocks and/or symbols) of the BWP of the serving cell for uplink cancellation, wherein the radio resources comprise the first radio resources.

As shown in FIG. 20, the wireless device may cancel second radio resources of the first radio resource based on the determining the first radio resources. In an example, the radio resources of the scheduled transmission, on the BWP of the serving cell, may comprise the second radio resources. In an example, the second radio resources of the first radio resources may be radio resources among those indicated for uplink cancellation that have overlap with the scheduled uplink transmission on the BWP of the serving cell. In an example, the cancelling the uplink transmission on the second radio resources may comprise stopping transmission of the scheduled uplink transmission on the second radio resources. In an example, the cancelling the uplink transmission on the second radio resources may comprise stopping transmission of the scheduled uplink transmission at an earliest symbol of the second radio resources and in the midst of the scheduled uplink transmission. In an example, the cancelling the uplink transmission on the second radio resources may comprise not transmitting the scheduled uplink transmission.

In an example embodiment, a downlink control information for uplink cancellation indication (e.g., associated with the cancellation indication RNTI) may comprise and/or indicate uplink cancellation indications for a plurality of BWPs and/or uplink carriers of a plurality of cells. In an example, the wireless device may determine an uplink cancellation indication for a BWP and/or uplink carrier of a cell based on the receiving the downlink control information.

In an example embodiment as shown in FIG. 23, the uplink cancellation configuration parameters may comprise a sequence of parameters/information elements (IEs), wherein an IE in the sequence of one or more IEs may comprise: a target cell parameter indicating an identifier of a serving cell, a first cancellation indication index for a first uplink carrier of the serving cell and a second cancellation indication index for a second uplink carrier of the serving cell. In an example, the first uplink carrier may be one of a normal uplink carrier and a supplementary uplink carrier. In an example, the second uplink carrier, different from the first uplink carrier, may be one of the normal uplink carrier and the supplementary uplink carrier. In an example, the first uplink cancellation indication index may be an integer between one and a max number, wherein the max number may indicate a number of the uplink cancellation indications in the downlink control information. In an example, the second uplink cancellation index may be an integer between one and a max number, wherein the max number may indicate a number of the uplink cancellation indications in the downlink control information. In an example, the size of an uplink cancellation indication may be a fixed number.

Figure 22:
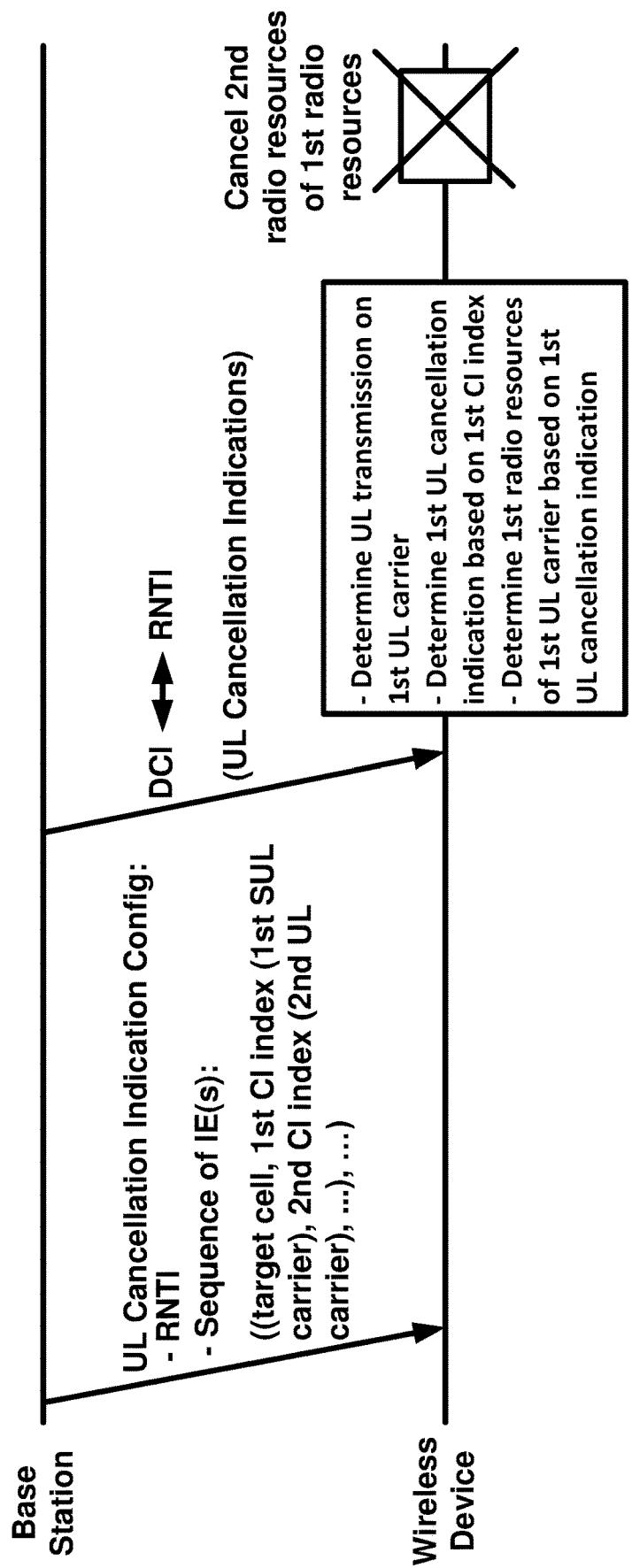
FIG. 22 shows an example process in accordance with several of various embodiments of the present disclosure.

As shown in FIG. 22, the wireless device may receive a downlink control information, associated with the RNTI (e.g., CI-RNTI), wherein the downlink control information may comprise a plurality of uplink cancellation indications. In an example, the plurality of uplink cancellation indications may be for a plurality of cells. In an example, the plurality of uplink cancellation indications may be for a plurality of uplink carrier of a plurality of cell. The downlink control information may be a group common DCI and the wireless device may receive the downlink control information in a common search space of a control channel.

As shown in FIG. 22, the wireless device may determine that an uplink transmission is scheduled on the first uplink carrier of the serving cell. For example, the wireless device may determine that a dynamically scheduled PUSCH or a PUSCH based on a configured grant or a SRS or another signal/channel is scheduled for transmission via the first uplink carrier of the serving cell. The wireless device may determine, based on the downlink control information and the first uplink cancellation index, a first uplink cancellation indication in the plurality of uplink cancellation indications of the downlink control information. In an example, based on the determination that uplink transmission is scheduled on the first uplink carrier of the serving cell, the wireless device may determine, based on the downlink control information and the first uplink cancellation index, a first uplink cancellation indication in the plurality of uplink cancellation indications of the downlink control information.

As shown in FIG. 22, the wireless device may determine, based on the first uplink cancellation indication, first radio resources of the first uplink carrier of the serving cell. The wireless device may determine the first radio resources based on the first uplink cancellation indication and one or more configuration parameters (e.g., uplink cancellation indication configuration parameters). The wireless device may determine, based on the first uplink cancellation indication, radio resources (e.g., resource blocks and/or symbols) of the first uplink carrier of the serving cell for uplink cancellation, wherein the radio resources comprise the first radio resources.

As shown in FIG. 22, the wireless device may cancel second radio resources of the first radio resource based on the determining the first radio resources. In an example, the radio resources of the scheduled transmission, on the first uplink carrier of the servicing cell, may comprise the second radio resources. In an example, the second radio resources of the first radio resources may be radio resources among those indicated for uplink cancellation that have overlap with the scheduled uplink transmission on the first uplink carrier of the serving cell. In an example, the cancelling the uplink transmission on the second radio resources may comprise stopping transmission of the scheduled uplink transmission on the second radio resources. In an example, the cancelling the uplink transmission on the second radio resources may comprise stopping transmission of the scheduled uplink transmission at an earliest symbol of the second radio resources and in the midst of the scheduled uplink transmission. In an example, the cancelling the uplink transmission on the second radio resources may comprise not transmitting the scheduled uplink transmission.

In an example embodiment as shown in FIG. 25, the uplink cancellation configuration parameters may comprise a sequence of parameters/information elements (IEs), wherein an IE in the sequence of one or more IEs may comprise: a target cell indicating a first identifier of a serving cell, a target BWP indicating a target identifier of a BWP of the serving cell, an uplink cancellation index for the BWP of the serving cell.

Figure 24:
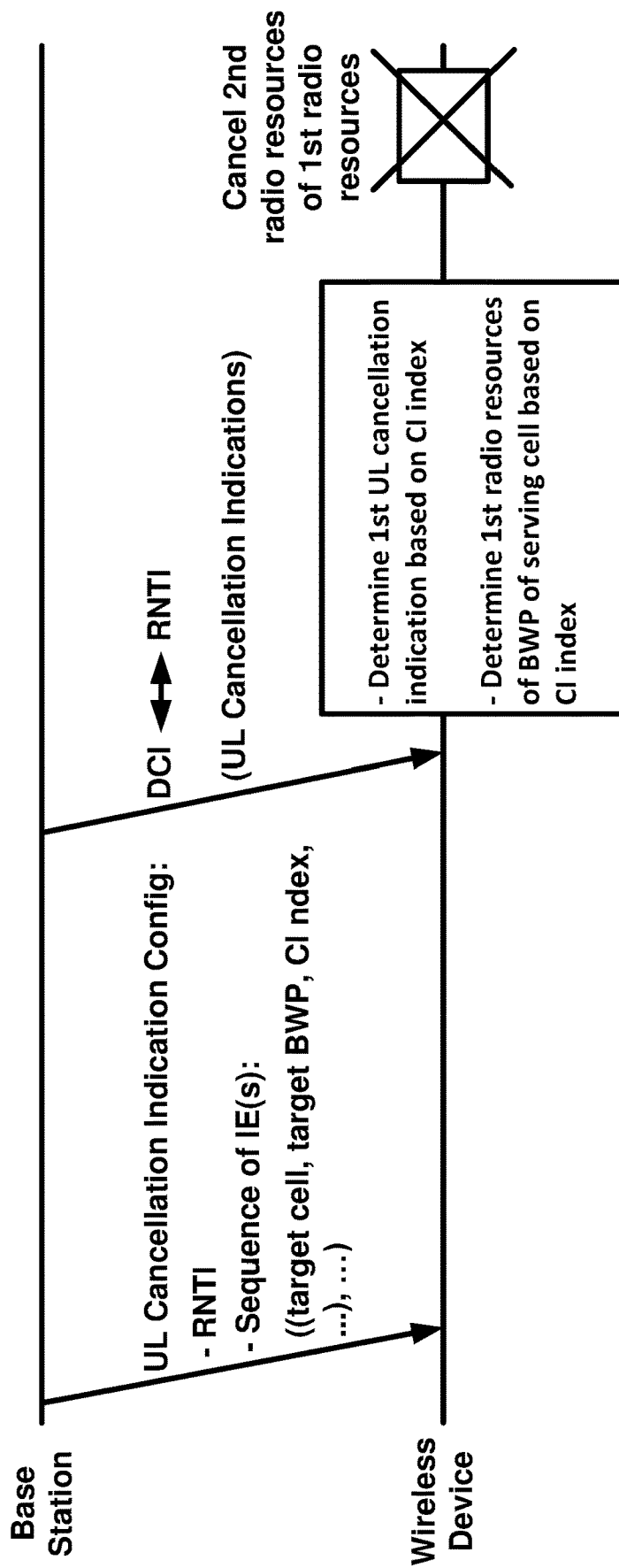
FIG. 24 shows an example process in accordance with several of various embodiments of the present disclosure.

As shown in FIG. 24, the wireless device may receive a downlink control information, associated with the RNTI (e.g., CI-RNTI), wherein the downlink control information may comprise a plurality of uplink cancellation indications. In an example, the plurality of uplink cancellations may be for a plurality of cells. In an example, the plurality of uplink cancellations may be for a plurality of BWPs of a plurality of cell. The downlink control information may be a group common DCI and the wireless device may receive the downlink control information in a common search space of a control channel.

As shown in FIG. 24, The wireless device may determine, based on the downlink control information and the uplink cancellation index, a first uplink cancellation indication in the plurality of uplink cancellation indications of the downlink control information.

As shown in FIG. 24, the wireless device may determine, based on the first uplink cancellation indication, first radio resources of the BWP of the serving cell. The wireless device may determine the first radio resources based on the first uplink cancellation indication and one or more configuration parameters (e.g., one or more uplink cancellation indication configuration parameters). The wireless device may determine, based on the first uplink cancellation indication, radio resources (e.g., resource blocks and/or symbols) of the BWP of the serving cell for uplink cancellation, wherein the radio resources comprise the first radio resources.

As shown in FIG. 24, the wireless device may cancel second radio resources of the first radio resource based on the determining the first radio resources. In an example, the radio resources of the scheduled transmission, on the BWP of the servicing cell, may comprise the second radio resources. In an example, the second radio resources of the first radio resources may be radio resources among those indicated for uplink cancellation that have overlap with the scheduled uplink transmission on the BWP of the serving cell. In an example, the cancelling the uplink transmission on the second radio resources may comprise stopping transmission of the scheduled uplink transmission on the second radio resources. In an example, the cancelling the uplink transmission on the second radio resources may comprise stopping transmission of the scheduled uplink transmission at an earliest symbol of the second radio resources and in the midst of the scheduled uplink transmission. In an example, the cancelling the uplink transmission on the second radio resources may comprise not transmitting the scheduled uplink transmission.

In an example embodiment, a wireless device may receive separate uplink cancellation indication configuration parameters for different channels (e.g., PUSCH) and/or signals (SRS) whose transmission may be cancelled by an uplink cancellation indication. In an example, the uplink cancellation indication configuration parameters may comprise first parameters that may be shared between different signals and/or channels. In addition to the first parameters, different channels and signals may have their specific configuration parameters.

In an example embodiment, a wireless device may receive uplink cancellation configuration parameters, comprising: a radio network temporary identifier; a sequence of one or more parameters/IEs, a first parameter/IE in the one or more parameters/IEs indicating: an identifier of a serving cell (e.g., a serving cell index); a first position, in a downlink control information, for a first uplink carrier of the serving cell; and a second position, in a downlink control information, for a second uplink carrier of the serving cell. The wireless device may receive a downlink control information, associated with the radio network temporary identifier, comprising a plurality of uplink cancellation indications. The wireless device may determine that an uplink transmission is scheduled on the first uplink carrier. The wireless device may determine, based on the downlink control information and the first position, a first uplink cancellation indication of the plurality of uplink cancellation indications. The wireless device may determine, based on the first uplink cancellation indication, first radio resources of the first uplink carrier of the serving cell. The wireless device may cancel uplink transmission on second radio resources of the first the radio resources based on the determining the first radio resources.

In an example, the radio resources of the scheduled uplink transmission comprise the second radio resources.

In an example, the first position indicates an integer between one and a payload size of the download control information, wherein the payload size is a constant number.

In an example, the second position indicates an integer between one and a payload size of the download control information, wherein the payload size is a constant number.

In an example, the size of the uplink cancellation indication is a fixed number.

In an example, the determining the first resources may be based on the first uplink cancellation indication and one or more configuration parameters of the uplink cancellation indication.

In an example, the determining the first uplink cancellation index may be based on determining a first bit of the uplink cancellation indication based on the first position and determining a last bit of the uplink cancellation indication based on a size of the uplink cancellation indication.

In an example, the receiving the downlink control channel may be within a common search space of a downlink control channel.

In an example, the first uplink carrier may be a normal uplink carrier.

In an example, the second uplink carrier may be a supplementary uplink carrier.

In an example, the wireless device may determine, based on the first uplink cancellation indication, radio resources (resource blocks and symbols) of the first uplink carrier of the serving cell for uplink cancellation, wherein the radio resources comprise the first radio resources.

In an example, the downlink control information may be a group common DCI; and the downlink control information may be received in a common search space.

In an example, the plurality of cancellation indications may be for a plurality of cells.

In an example, the plurality of cancellation indications may be for a plurality of uplink carriers of a plurality of cells.

In an example, the cancelling the uplink transmission on the second radio resources may comprise stopping transmission on the second radio resources in the middle of a first uplink transmission. In an example, the first uplink transmission may be via a physical uplink shared channel (e.g., using a dynamic grant or configured grant). In an example, the first uplink transmission may be a sounding reference signal.

In an example embodiment, a wireless device may receive uplink cancellation configuration parameters, comprising: a radio network temporary identifier; and a sequence of one or more parameters/IEs, a first parameter/IE of the one or more parameters/IEs indicating: an identifier of a serving cell with a plurality of uplink carriers; and a position, in a downlink control information, for a first uplink carrier of the plurality of uplink carriers. The wireless device may receive a downlink control information, associated with the radio network temporary identifier, comprising a plurality uplink cancellation indications. The wireless device may determine that an uplink transmission is scheduled on the first uplink carrier of the serving cell. The wireless device may determine, based on the downlink control information and the position, a first uplink cancellation indication of the plurality of uplink cancellation indications. The wireless device may determine, based on the first uplink cancellation indication, first radio resources of the uplink carrier of the serving cell. The wireless device may cancel uplink transmission on second radio resources of the first the radio resources based on the determining the first radio resources.

In an example, the radio resources of the scheduled uplink transmission may comprise the second radio resources.

In an example, the position may indicate an integer between one and a payload size of the download control information, wherein the payload size is a constant number.

In an example, a size of the uplink cancellation indication may be a fixed number.

In an example, the determining the first resources may be based on the first uplink cancellation indication and one or more configuration parameters of the uplink cancellation indication.

In an example, the determining the first uplink cancellation index may be based on determining a first bit of the uplink cancellation indication based on the first position and determining a last bit of the uplink cancellation indication based on a size of the uplink cancellation indication.

In an example, the receiving the downlink control may be within a common search space of a downlink control channel.

In an example, radio resources of an uplink transmission and the first radio resources may overlap on the second radio resources. In an example, the cancelling the uplink transmission on the second radio resources comprises stopping transmission on the second radio resources in the middle of a first uplink transmission.

In an example, the uplink transmission may be via a physical uplink shared channel. In an example, the wireless device may receive a DCI/uplink grant for the transmission via the PUSCH. In an example, the uplink transmission may be for transmission via a configured grant. In an example, the wireless device may receive a DCI indicating activation of a plurality of resources comprising second radio resources.

In an example, the uplink transmission may be for SRS. In an example, the wireless device may receive a DCI comprising a field, a value of the field indicating a request for the transmission of the SRS.

In an example, the downlink control information may be received via a common search space.

In an example, the uplink cancellation indication may indicate one or more symbols. In an example, the downlink control information is received at a first timing; and the one or more symbols is based on the first timing. In an example, a first symbol of the one or more symbols may start at an offset from the first timing.

In an example, an uplink cancellation in the plurality of uplink cancellations may comprises a first/fixed/constant number of bits. The uplink cancellation configuration parameters may indicate a size of the downlink control information. The second number of the plurality of uplink cancellation indications may be based on the size and the first number.

In an example embodiment, a wireless device may receive uplink cancellation configuration parameters, comprising: a radio network temporary identifier; and a sequence of one or more parameters/IEs, a first parameter/IE in the one or more parameters/IEs indicating: a first identifier of a serving cell; a second identifier of a bandwidth part of the serving cell; and a position, in a downlink control information, for the bandwidth part of the serving cell. The wireless device may receive a downlink control information, associated with the radio network temporary identifier, comprising a plurality uplink cancellation indications. The wireless device may determine, based on the downlink control information and the position, a first uplink cancellation indication of the plurality of uplink cancellation indications. The wireless device may determine, based on the first uplink cancellation indication, first radio resources of the bandwidth part of the serving cell. The wireless device may cancel uplink transmission on second radio resources of the first the radio resources based on the determining the first radio resources.

In an example embodiment, a wireless device may receive configuration parameters for uplink cancellation indication, comprising: a first radio network temporary identifier; a sequence of one or more parameters/IEs, a first parameter/IE in the one or more parameters/IEs indicating: a target cell parameter indicating an identifier of a serving cell; a first cancellation indication index for a first uplink carrier of the serving cell; and a second cancellation indication index for a second uplink carrier of the serving cell. The wireless device may receive a downlink control information, associated with the first radio network identifier, comprising a plurality of uplink cancellation indications. The wireless device may determine that an uplink transmission is scheduled on the first uplink carrier of the serving cell. The wireless device may determine, based on the downlink control information and the first cancellation indication index, a first uplink cancellation indication of the plurality of uplink cancellation indications. The wireless device may determine, based on the first uplink cancellation indication, first radio resources of the first uplink carrier of the serving cell. The wireless device may cancel uplink transmission on second radio resources of the first the radio resources based on the determining the first radio resources.

In an example, radio resources of the scheduled uplink transmission comprise the second radio resources.

In an example, the first uplink cancellation index may be an integer between one and a max number, wherein the max number may indicate a number of the uplink cancellation indications indicated by the downlink control information.

In an example, the second uplink cancellation index may be an integer between one and a max number, wherein the max number may indicate a number of the uplink cancellation indications indicated by the downlink control information.

In an example, a size of the uplink cancellation indication may be a fixed number.

In an example, the determining the first resources may be based on the first uplink cancellation indication and one or more configuration parameters of the uplink cancellation indication.

In an example, the receiving the downlink control may be within a common search space of a downlink control channel.

In an example, the first uplink carrier is a normal uplink carrier.

In an example, the second uplink carrier is a supplementary uplink carrier.

In an example, the first cancellation index may indicate a first position of the first uplink cancellation indication in the downlink control information; and the second cancellation index may indicate a second position of the second uplink cancellation indication in the downlink control information.

In an example embodiment, a wireless device may receive configuration parameters for uplink cancellation indication, comprising: a first radio network temporary identifier; a sequence of one or more parameters/IEs, a first parameter/IE in the one or more parameters/IEs indicating: a target cell parameter indicating an identifier of a serving cell with a plurality of uplink carriers; and a cancellation indication index for a first uplink carrier of the plurality of uplink carriers. The wireless device may receive a downlink control information, associated with the first radio network identifier, comprising a plurality of uplink cancellation indications. The wireless device may determine, based on the downlink control information and the cancellation indication index, a first uplink cancellation indication of the plurality of uplink cancellation indications. The wireless device may determine, based on the first uplink cancellation indication, first radio resources of the first uplink carrier of the serving cell. The wireless device may cancel uplink transmission on second radio resources of the first the radio resources based on the determining the first radio resources.

In an example, radio resources of the scheduled uplink transmission comprise the second radio resources.

In an example, the uplink cancellation index may be an integer between one and a max number, wherein the max number may indicate a number of the uplink cancellation indications indicated by the downlink control information.

In an example, a size of the uplink cancellation indication may be a fixed number.

In an example, the determining the first resources may be based on the first uplink cancellation indication and one or more configuration parameters of the uplink cancellation indication.

In an example, the receiving the downlink control may be within a common search space of a downlink control channel.

In an example, the first uplink carrier is a normal uplink carrier.

In an example, the second uplink carrier is a supplementary uplink carrier.

In an example, the first cancellation index may indicate a first position of the first uplink cancellation indication in the downlink control information; and the second cancellation index may indicate a second position of the second uplink cancellation indication in the downlink control information.

In an example embodiment, a wireless device may receive configuration parameters for uplink cancellation indication, comprising: a first radio network temporary identifier; a sequence of one or more parameters/IEs, a first parameter/IE in the one or more parameters/IEs indicating: a target cell parameter indicating an identifier of a serving cell; a target BWP parameter indicating an identifier of a BWP; and an uplink cancellation indication index for the BWP of the serving cell. The wireless device may receive a downlink control information, associated with the first radio network identifier, comprising a plurality of uplink cancellation indications. The wireless device may determine, based on the downlink control information and the uplink cancellation indication index, a first uplink cancellation indication of the plurality of uplink cancellation indications. The wireless device may determine, based on the first uplink cancellation indication, first radio resources of the BWP of the serving cell. The wireless device may cancel uplink transmission on second radio resources of the first the radio resources based on the determining the first radio resources.

Figure 26:
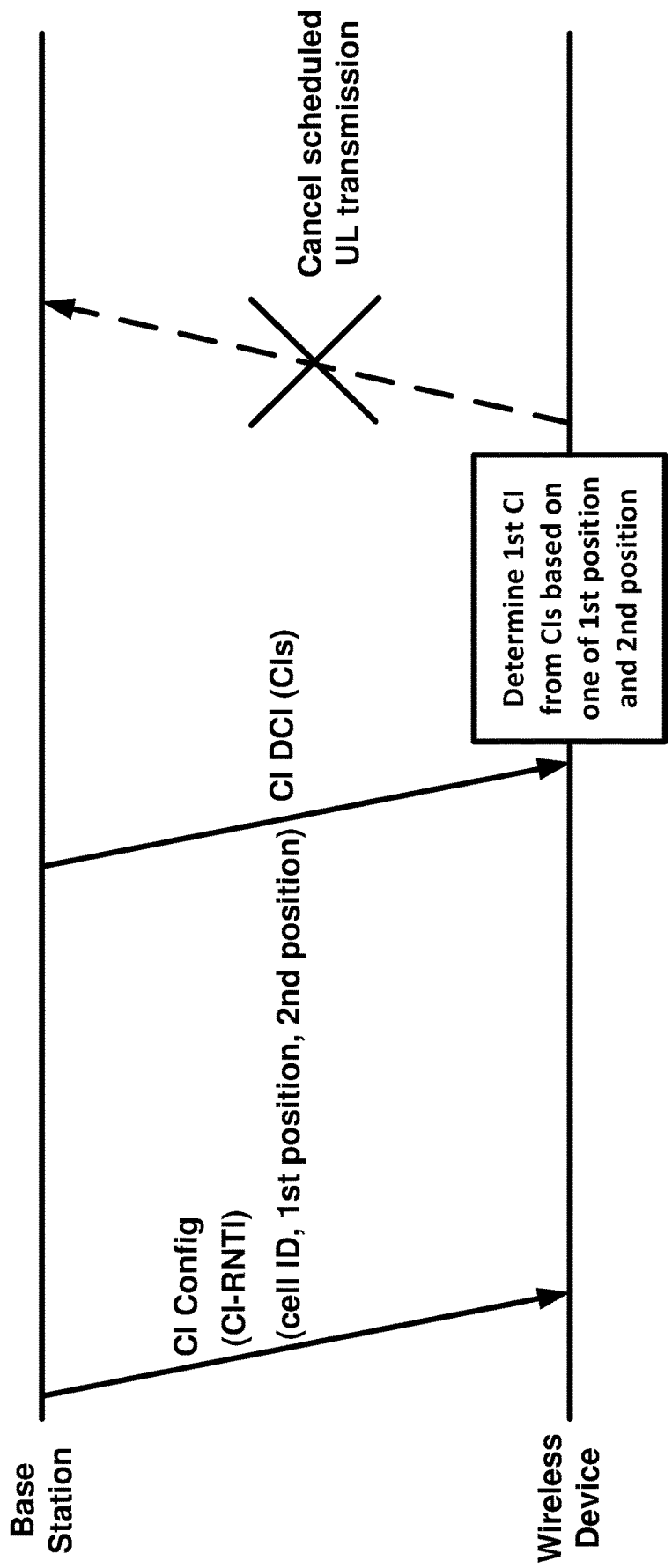
FIG. 26 shows an example uplink cancellation process in accordance with several of various embodiments of the present disclosure.

In an example embodiment as shown in FIG. 26, a wireless device may receive one or more messages comprising configuration parameters. The one or more messages may comprise one or more RRC messages. The configuration parameters may comprise uplink cancellation configuration parameters. An UplinkCancellation IE may be used to configure uplink cancellation configuration parameters and may be used to configure a wireless device to monitor a control channel (PDCCH) for an RNTI associated with uplink cancellation (e.g., CI-RNTI). The uplink cancellation configuration parameters may comprise a cancellation indication RNTI (e.g., CI-RNTI). The uplink cancellation indication configuration parameters may further comprise a sequence of serving cell-specific uplink cancellation indication IE (e.g., a sequence of CI-ConfigurationPerServingCell IEs). A serving cell-specific uplink cancellation indication IE may comprise an identifier of a serving cell (e.g., a serving cell index), a first parameter (e.g., a positionInDCI parameter) indicating a first position in a DCI (a cancellation indication DCI) for a serving cell (e.g., a normal uplink (NUL) carrier of a serving cell), a second parameter (e.g., a positionInDCI-ForSUL parameter) indicating a second position in a DCI (a cancellation indication DCI) for a supplementary uplink (SUL) carrier of the serving cell. The first parameter (e.g., the positionInDCI parameter) may indicate a starting position (in number of bit) of a cancellation indication value applicable for this serving cell (servingCellId) within the DCI payload. The number of bit may be from one to the payload size of the DCI. The number of bit may indicate the first bit to the n-th bit (n=payload size of the DCI). The second parameter (e.g., the positionInDCI-ForSUL parameter) may indicate a starting position (in number of bit) of a cancellation indication value applicable for SUL of this serving cell (servingCellId) within the DCI payload. The number of bit may be from one to the payload size of the DCI. The number of bit may indicate the first bit to the n-th bit (n=payload size of the DCI). The uplink cancellation configuration parameters may include a DCI payload size parameter (e.g., dci-PayloadSizeForCI) indicating a total length of the DCI payload scrambled with CI-RNTI.

The wireless device may receive a first DCI (cancellation indication DCI) associated with the cancellation indication RNTI (CI-RNTI). The wireless device may receive the first DCI by monitoring a common search space (CSS) configured for monitoring control channels associated with CI-NTI. The wireless device may receive configuration parameters for monitoring the CSS used for monitoring control channels associated with CI-NTI. The first DCI may comprise a plurality of cancellation indications (CIs). The wireless device may determine a first CI in the plurality of CIs of the first DCI. The wireless device may determine the first CI based on one of the first position and the second position. The wireless device may determine the first CI based on the first position when a scheduled uplink transmission is for a NUL of the serving cell. The wireless device may determine the first CI based on the second position when a scheduled uplink transmission is for a SUL of the serving cell. The wireless may determine the first CI further based on the cancellation indication size. In an example, the wireless device may determine cancelled uplink resources based on the first CI. The wireless device may determine the cancelled uplink resources based on the first DCI and based on uplink cancellation configuration parameters. In an example, the serving cell specific configuration parameters may comprise an offset parameter indicating an offset from the end of a PDCCH reception where the UE detects the cancellation indication DCI format and a first symbol of cancelled uplink resources, in the unit of OFDM symbols. The wireless device may determine the cancelled uplink resources based on the offset parameter indicating the offset. In an example, the wireless device may determine the cancelled uplink resources based on a processing time (e.g., a processing time of the first DCI (cancellation DCI)). The wireless device may cancel the scheduled uplink transmission based on the first CI.

Figure 27:
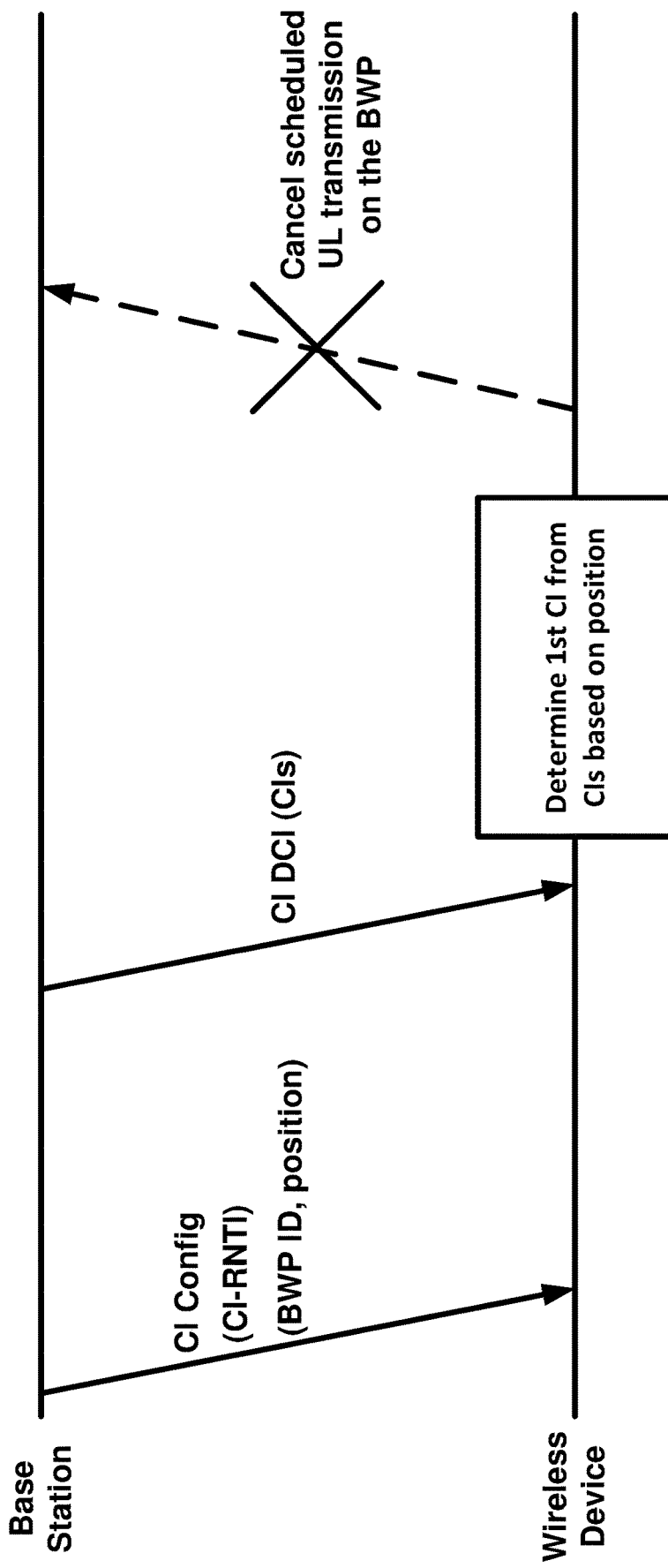
FIG. 27 shows an example uplink cancellation process in accordance with several of various embodiments of the present disclosure.

In an example embodiment as shown in FIG. 27, a wireless device may receive one or more messages comprising configuration parameters. The one or more messages may comprise one or more RRC messages. The configuration parameters may comprise uplink cancellation configuration parameters. An UplinkCancellation IE may be used to configure uplink cancellation configuration parameters and may be used to configure the wireless device to monitor a control channel (PDCCH) for an RNTI associated with uplink cancellation (e.g., CI-RNTI). The uplink cancellation configuration parameters may comprise a cancellation indication RNTI (e.g., CI-RNTI). The uplink cancellation configuration parameters may comprise an identifier of a BWP. In an example, the uplink cancellation configuration parameters may comprise an identifier of a cell comprising a plurality of BWPs including the BWP. The uplink cancellation configuration parameters may comprise a parameter indicating a position in a DCI, wherein the position may be used for determining a cancellation indication in a plurality of cancellation indications of a cancellation indication DCI, wherein the cancellation indication may be associated with uplink transmissions on the BWP.

The wireless device may receive a first DCI (cancellation indication DCI) associated with the cancellation indication RNTI (CI-RNTI). The wireless device may receive the first DCI by monitoring a common search space (CSS) configured for monitoring control channels associated with CI-NTI. The wireless device may receive configuration parameters for monitoring the CSS used for monitoring control channels associated with CI-NTI. The first DCI may comprise a plurality of cancellation indications (CIs). The wireless device may determine a first CI in the plurality of CIs of the first DCI. The wireless device may determine the first CI based on the position. The wireless device may determine the first CI based on the position when an uplink transmission is scheduled on the BWP. The wireless device may cancel the scheduled uplink transmission based on the first CI.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel.

In some examples, one or more additional events or actions may occur or may be performed prior to, after, or in between the events or actions shown in the flow charts of the present disclosure.

FIG. 28 shows an example flow diagram in accordance with several of various embodiments of the present disclosure. At 2810, a wireless device may receive uplink cancellation configuration parameters comprising: a cancellation indication radio network temporary identifier (RNTI); and a sequence of serving cell-specific parameters comprising: an identifier of a serving cell; a first parameter indicating a first position in a downlink control information (DCI) for the serving cell; and a second parameter indicating a second position in a DCI for a supplementary uplink carrier of the serving cell. At 2820, the wireless device may receive a first DCI, associated with the cancellation indication RNTI, comprising cancellation indications. At 2830, the wireless device may determine a first cancellation indication, in the cancellation indications, based on: the first position when a scheduled uplink transmission is for a normal uplink carrier of the serving cell; and the second position when the scheduled uplink transmission is for the supplementary uplink carrier of the serving cell. At 2840, the wireless device may cancel the scheduled uplink transmission based on the first cancellation indication.

In an example embodiment, the determining the first cancellation indication, at 2830, may further be based on a size of the first cancellation indication.

In an example embodiment, at 2810, the first position may indicate a first starting position, of a cancellation indication, in a first number of bit; and the second position may indicate a second starting position, of a cancellation indication, in a second number of bit. In an example embodiment, the first number of bit may be between one and a payload size of the first DCI; and the second number of bit may be between one and the payload size of the first DCI. In an example embodiment, the uplink cancellation configuration parameters, received at 2810, may further comprise a size parameter indicating the payload size of the first DCI.

In an example embodiment, the scheduled uplink transmission may be via a physical uplink shared channel.

In an example embodiment, the scheduled uplink transmission may be a sounding reference signal transmission.

In an example embodiment, the wireless device may monitor a common search space for a DCI associated with the cancellation indication RNTI.

In an example embodiment, the wireless device may determine cancelled uplink resources based on the first cancellation indication. In an example embodiment, the sequence of serving cell-specific parameters, received at 2810, may further comprise an offset parameter indicating an offset, in unit of symbol, from an end of a control channel reception where the wireless device detects the first DCI. The wireless device may determine the cancelled uplink resources further based on the offset. In an example embodiment, the determining the cancelled uplink resources may comprise determining a first symbol associated with the cancelled uplink resources based on the offset. In an example embodiment, the determining the cancelled uplink resources may further be based on a processing time associated with the first DCI.

Figure 29:
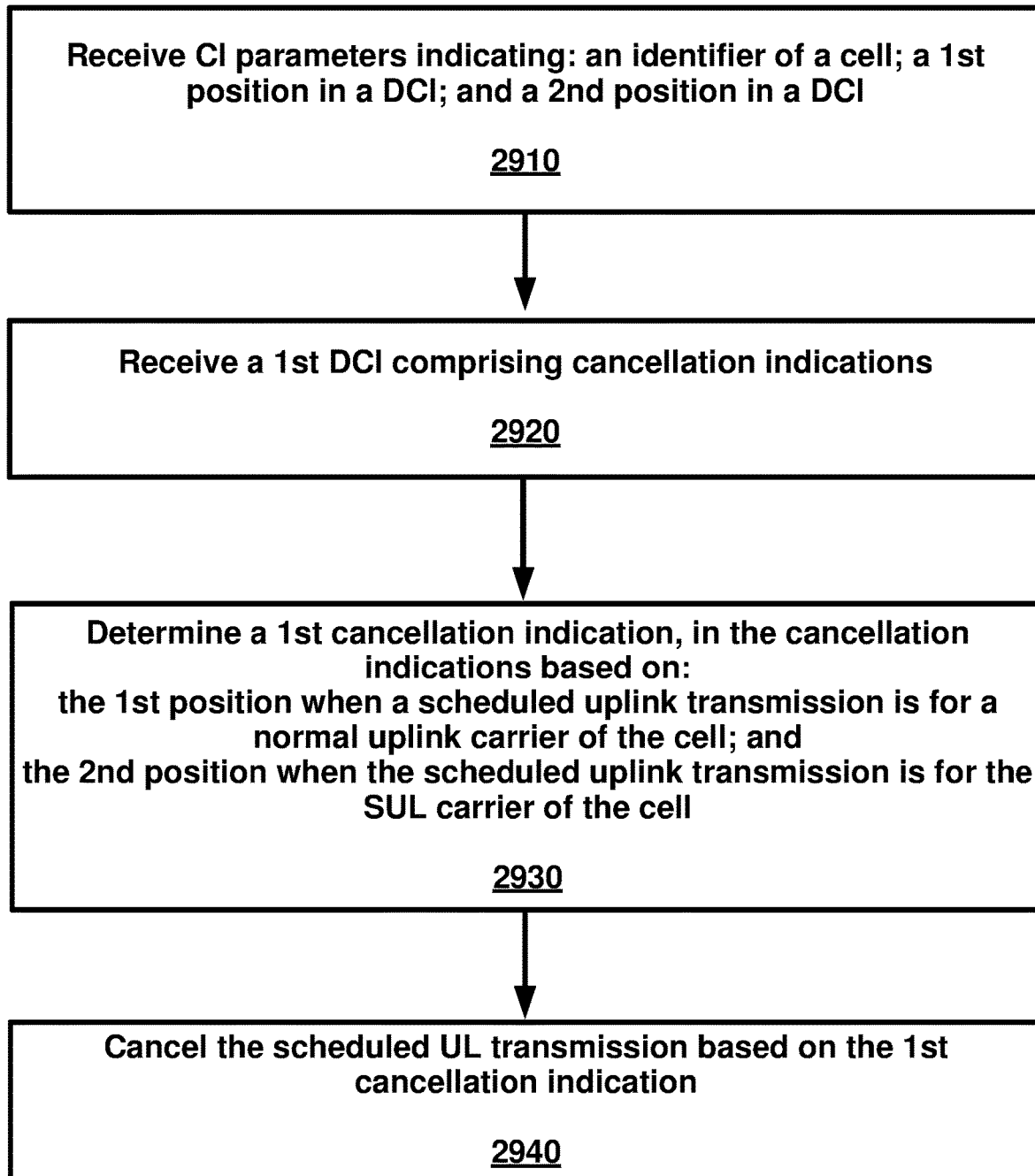
FIG. 29 shows an example flow diagram in accordance with several of various embodiments of the present disclosure.

FIG. 29 shows an example flow diagram in accordance with several of various embodiments of the present disclosure. At 2910, a wireless device may receive cancellation indication parameters indicating: an identifier of a cell; a first position in a downlink control information (DCI); and a second position in a DCI. At 2920, the wireless device may receive a first DCI comprising cancellation indications. At 2930, the wireless device may determine a first cancellation indication, in the cancellation indications, based on: the first position when a scheduled uplink transmission is for a normal uplink carrier of the cell; and the second position when a scheduled uplink transmission for a supplementary uplink carrier of the cell. At 2940, the wireless device may cancel the scheduled uplink transmission based on the first cancellation indication.

In an example embodiment, the cancellation indication parameters, received 2910, may further comprise a cancellation indication radio network temporary identifier (RNTI). The first DCI, received at 2920, may be associated with the cancellation indication RNTI.

Figure 30:
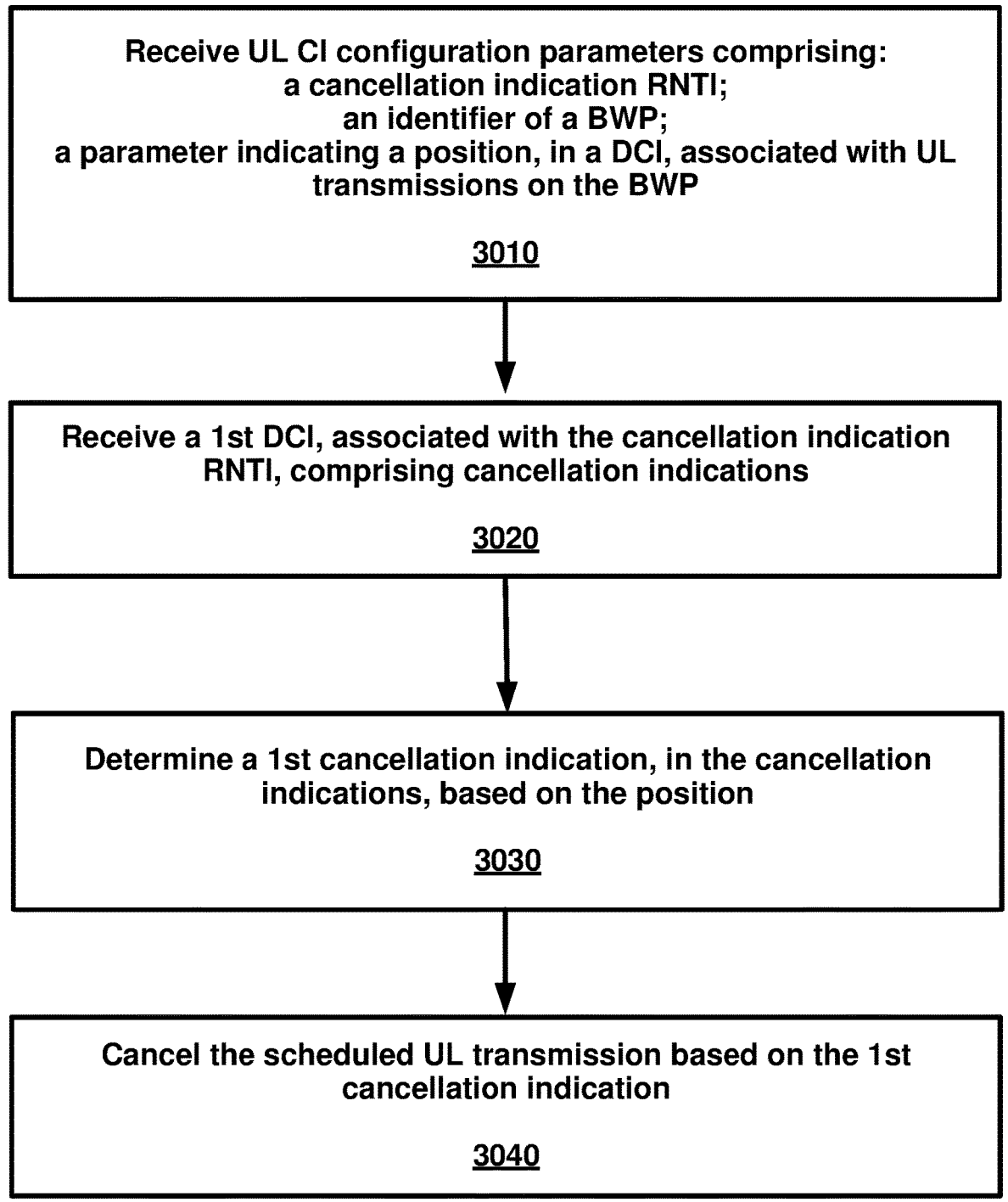
FIG. 30 shows an example flow diagram in accordance with several of various embodiments of the present disclosure.

FIG. 30 shows an example flow diagram in accordance with several of various embodiments of the present disclosure. At 3010, a wireless device may receive uplink cancellation configuration parameters comprising: a cancellation indication radio network temporary identifier (RNTI); an identifier of a BWP; and a parameter indicating a position, in a downlink control information (DCI), associated with uplink transmissions on the BWP. At 3020, the wireless device may receive a first DCI, associated with the cancellation indication RNTI, comprising cancellation indications. At 3030, the wireless device may determine a first cancellation indication, in the cancellation indications, based on the position. At 3040, the wireless device may cancel a scheduled uplink transmission on the BWP based on the first cancellation indication.

In an example embodiment, the uplink cancellation configuration parameters, received 3010, may further comprise an identifier of a cell comprising the BWP.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least"

indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device, configuration parameters indicating:
   a first position in a first number of bit; and
   a second position in a second number of bit;
   wherein the first number of bit and the second number of bit are based on a payload size;
   receiving cancellation indications;
   cancelling a scheduled transmission based on a first cancellation indication, of the cancellation indications, that is:
   based on the first position when the scheduled transmission is for a normal carrier; and
   based on the second position when the scheduled transmission is for a supplementary carrier.

2. The method of claim 1, wherein the first cancellation indication is further based on a cancellation indication size.

3. The method of claim 1, wherein:
   the receiving the cancellation indications is based on a downlink control information (DCI);
   the first number of bit identifies a first bit within a payload of the DCI; and
   the second number of bit identifies a second bit within the payload.

4. The method of claim 1, wherein the configuration parameters comprise a size parameter indicating the payload size.

5. The method of claim 1, wherein the scheduled transmission is via a physical uplink shared channel.

6. The method of claim 1, wherein the scheduled transmission is a sounding reference signal transmission.

7. The method of claim 1, further comprising monitoring a common search space for a downlink control information (DCI) associated with a cancellation indication radio network temporary identifier (RNTI), wherein the configuration parameters indicate the cancellation indication RNTI.

8. The method of claim 1, further comprising determining cancelled resources based on the first cancellation indication.

9. The method of claim 8, wherein:
   the configuration parameters comprise an offset parameter indicating an offset, in unit of symbol, from an end of a control channel reception where the wireless device detects a downlink control information (DCI) comprising the cancellation indications; and
   the determining the cancelled resources is further based on the offset.

10. The method of claim 9, wherein the determining the cancelled resources comprises determining a first symbol associated with the cancelled resources based on the offset.

11. A wireless device comprising:
    one or more processors; and
    memory storing instructions that, when executed by the one or more processors, cause the wireless device to:
    receive configuration parameters indicating:
    a first position in a first number of bit; and
    a second position in a second number of bit;
    wherein the first number of bit and the second number of bit are based on a payload size;
    receive cancellation indications;
    cancel a scheduled transmission based on a first cancellation indication, of the cancellation indications, that is:
    based on the first position when the scheduled transmission is for a normal carrier; and
    based on the second position when the scheduled transmission is for a supplementary carrier.

12. The wireless device of claim 11, wherein the first cancellation indication is further based on a cancellation indication size.

13. The wireless device of claim 11, wherein:
    receiving the cancellation indications is based on a downlink control information (DCI);
    the first number of bit identifies a first bit within a payload of the DCI; and
    the second number of bit identifies a second bit within the payload.

14. The wireless device of claim 11, wherein the configuration parameters comprise a size parameter indicating the payload size.

15. The wireless device of claim 11, wherein the scheduled transmission is via a physical uplink shared channel.

16. The wireless device of claim 11, wherein the scheduled transmission is a sounding reference signal transmission.

17. The wireless device of claim 11, wherein the instructions, when executed by the one or more processors, further cause the wireless device to monitor a common search space for a downlink control information (DCI) associated with a cancellation indication radio network temporary identifier (RNTI), wherein the configuration parameters indicate the cancellation indication RNTI.

18. The wireless device of claim 11, wherein the instructions, when executed by the one or more processors, further cause the wireless device to determine cancelled resources based on the first cancellation indication.

19. The wireless device of claim 18, wherein:
    the configuration parameters comprise an offset parameter indicating an offset, in unit of symbol, from an end of a control channel reception where the wireless device detects a downlink control information (DCI) comprising the cancellation indications; and
    determining the cancelled resources is further based on the offset.

20. A system comprising:
    a base station comprising: one or more first processors; and first memory storing instructions that, when executed by the one or more first processors, cause the base station to: transmit configuration parameters indicating: a first position in a first number of bit; and a second position in a second number of bit; wherein the first number of bit and the second number of bit are based on a payload size; and transmit cancellation indications; and a wireless device comprising: one or more second processors; and second memory storing instructions that, when executed by the one or more second processors, cause the wireless device to: receive the configuration parameters; receive the cancellation indications; cancel a scheduled transmission based on a first cancellation indication, of the cancellation indications, that is: based on the first position when the scheduled transmission is for a normal carrier; and based on the second position when the scheduled transmission is for a supplementary carrier.

* * * * *